United States Patent [19]
Synosky et al.

[11] Patent Number: 5,436,013
[45] Date of Patent: Jul. 25, 1995

[54] PROCESS FOR MANUFACTURING WAX-FREE CHEWING GUMS WITH FAST SET-UP TIMES

[75] Inventors: Steven P. Synosky, Greenbrook, N.J.; Kenneth W. Laughlin, Richardson, Tex.; Michael A. Reed, Merrillvile, Ind.

[73] Assignee: Wm. Wrigley Jr. Company, Chicago, Ill.

[21] Appl. No.: 295,838

[22] PCT Filed: Mar. 2, 1993

[86] PCT No.: PCT/US93/01943

§ 371 Date: Aug. 30, 1994

§ 102(e) Date: Aug. 30, 1994

[87] PCT Pub. No.: WO93/17579

PCT Pub. Date: Sep. 16, 1993

[51] Int. Cl.[6] .............................................. A23G 3/30
[52] U.S. Cl. .................................... 426/3; 426/5
[58] Field of Search ............................... 426/3, 5

[56] References Cited

U.S. PATENT DOCUMENTS

| | | | |
|---|---|---|---|
| 1,534,929 | 4/1925 | Dunham | 426/5 |
| 1,534,930 | 4/1925 | Dunham | 426/5 |
| 1,534,931 | 4/1925 | Dunham | 426/5 |
| 1,807,704 | 6/1931 | Pappadis | 426/5 |
| 2,078,878 | 4/1937 | Jackman | 99/135 |
| 2,265,465 | 12/1941 | Wilson | 99/135 |
| 2,289,407 | 7/1942 | Hampton | 99/135 |
| 2,782,123 | 2/1957 | Rubin | 99/141 |
| 3,161,524 | 12/1964 | Opie et al. | 99/94 |
| 3,262,784 | 7/1966 | Bucher | 99/135 |
| 3,632,358 | 1/1972 | Echeandia et al. | 99/135 |
| 3,766,165 | 10/1973 | Rennhard | 260/209 R |
| 3,843,818 | 10/1974 | Wren et al. | 426/346 |
| 3,857,965 | 12/1974 | Ream | 426/3 |
| 3,894,146 | 7/1975 | Tsuyama | 424/49 |
| 3,974,032 | 8/1976 | Harjes et al. | 195/31 R |
| 3,984,574 | 10/1976 | Comollo | 426/4 |
| 3,995,064 | 11/1976 | Ehrgott et al. | 426/3 |
| 3,996,389 | 12/1976 | Osborne | 426/565 |
| 4,065,579 | 12/1977 | Mackay et al. | 426/3 |
| 4,139,639 | 2/1979 | Bahoshy et al. | 426/3 |
| 4,150,161 | 4/1979 | Rudolph et al. | 426/3 |
| 4,187,320 | 2/1980 | Koch et al. | 426/3 |
| 4,224,345 | 9/1980 | Tezuka et al. | 426/3 |
| 4,230,687 | 10/1980 | Sair et al. | 424/22 |
| 4,352,822 | 9/1981 | Cherukuri et al. | 426/4 |
| 4,352,823 | 10/1982 | Cherukuri et al. | 426/5 |
| 4,357,355 | 11/1982 | Koch et al. | 426/4 |
| 4,359,531 | 11/1982 | Bucke et al. | 435/97 |

(List continued on next page.)

FOREIGN PATENT DOCUMENTS 0067665 12/1982 European Pat. Off. ....... A23G 3/30

(List continued on next page.)

OTHER PUBLICATIONS

"Fructooligosaccharides (FOS)—An All Natural, Versatile, Low-Calorie Bulking Agent", by Dr. Peter Perna, Coors Biotech, Inc. (date Unknown).

(List continued on next page.)

Primary Examiner—Jeanette Hunter
Attorney, Agent, or Firm—Maxwell J. Petersen; Willian Brinks Hofer Gilson & Lione

[57] ABSTRACT

A method of rapidly producing a final wax-free chewing gum product is disclosed. The chewing gum is made using a chewing gum base which is devoid or substantially free of wax. The gum base includes about 20 to about 60 weight percent synthetic elastomer, 0 to about 30 weight percent natural elastomer, about 5 to about 55 weight percent elastomer plasticizer, about 4 to about 40 weight percent filler, about 5 to about 40 weight percent softener, and optional minor amounts of miscellaneous ingredients such as colors, antioxidants, etc. Chewing gum compositions are provided which compositions temper rapidly in production and which chewing gums provide an initial soft bite, but still are produced more efficiently than comparable wax containing chewing gums.

38 Claims, 4 Drawing Sheets

U.S. PATENT DOCUMENTS

| | | | |
|---|---|---|---|
| 4,382,963 | 5/1983 | Klose et al. | 426/3 |
| 4,384,004 | 5/1983 | Cea et al. | 426/3 |
| 4,386,106 | 5/1983 | Merritt et al. | 426/5 |
| 4,387,108 | 6/1983 | Koch et al. | 426/4 |
| 4,452,820 | 6/1984 | D'Amelia et al. | 426/3 |
| 4,497,846 | 2/1985 | Boursier et al. | 426/660 |
| 4,514,422 | 4/1985 | Yang et al. | 426/3 |
| 4,515,769 | 5/1985 | Merritt et al. | 424/49 |
| 4,528,206 | 7/1985 | Kastin | 426/660 |
| 4,556,429 | 12/1985 | Takazoe et al. | 127/30 |
| 4,579,738 | 4/1986 | Cherukuri et al. | 426/3 |
| 4,581,234 | 4/1986 | Cherukuri et al. | 426/3 |
| 4,587,119 | 5/1986 | Bucke et al. | 424/48 |
| 4,587,125 | 5/1986 | Cherukuri et al. | 424/48 |
| 4,597,970 | 7/1986 | Sharma et al. | 426/5 |
| 4,604,287 | 8/1986 | Glass et al. | 426/5 |
| 4,634,593 | 1/1987 | Stroz et al. | 426/5 |
| 4,671,961 | 6/1987 | Patel et al. | 426/3 |
| 4,671,967 | 6/1987 | Patel et al. | 426/658 |
| 4,681,771 | 7/1987 | Adachi et al. | 426/658 |
| 4,683,138 | 7/1987 | Glass et al. | 426/5 |
| 4,695,326 | 9/1987 | Takazoe et al. | 127/30 |
| 4,728,515 | 3/1988 | Patel et al. | 426/3 |
| 4,737,366 | 4/1988 | Gergely et al. | 426/5 |
| 4,741,905 | 5/1988 | Huzinec | 426/3 |
| 4,765,991 | 8/1988 | Cherukuri et al. | 426/3 |
| 4,786,722 | 11/1988 | Zehner | 536/1.1 |
| 4,792,453 | 12/1988 | Reed et al. | 426/5 |
| 4,794,003 | 12/1988 | Cherukuri et al. | 426/6 |
| 4,802,924 | 2/1989 | Woznicki et al. | 427/3 |
| 4,804,544 | 2/1989 | Cherukuri et al. | 426/5 |
| 4,816,265 | 3/1989 | Cherukuri et al. | 426/3 |
| 4,872,884 | 10/1989 | Cherukuri et al. | 426/3 |
| 4,889,727 | 12/1989 | Dave et al. | 426/3 |
| 4,931,294 | 6/1990 | Yatka et al. | 426/3 |
| 4,933,188 | 6/1990 | Cherukuri et al. | 426/3 |
| 4,938,971 | 7/1990 | Chapdelaine et al. | 426/3 |
| 4,948,596 | 8/1990 | Bunick et al. | 426/3 |
| 4,954,353 | 9/1990 | Cherukuri et al. | 426/3 |
| 4,961,935 | 10/1990 | Cherukuri et al. | 426/3 |
| 4,971,787 | 11/1990 | Cherukuri et al. | 414/48 |
| 4,971,806 | 11/1990 | Cherukuri et al. | 426/5 |
| 4,975,287 | 12/1990 | Zibell et al. | 426/3 |
| 4,978,751 | 12/1990 | Biton et al. | 536/123 |
| 4,980,177 | 12/1990 | Cherukuri et al. | 426/3 |
| 4,983,405 | 1/1991 | Cherukuri et al. | 426/3 |
| 4,986,991 | 1/1991 | Yatka et al. | 426/3 |
| 5,009,900 | 4/1991 | Levine et al. | 426/96 |
| 5,023,093 | 6/1991 | Cherukuri et al. | 426/3 |
| 5,039,530 | 8/1991 | Yatka et al. | 426/3 |
| 5,041,294 | 8/1991 | Patel | 426/3 |
| 5,059,429 | 10/1991 | Cherukuri et al. | 426/3 |
| 5,066,511 | 11/1991 | Cherukuri et al. | 426/658 |
| 5,082,671 | 1/1992 | Cherukuri | 426/3 |
| 5,085,872 | 2/1992 | Patel et al. | 426/4 |
| 5,087,459 | 2/1992 | Chuu et al. | 426/4 |
| 5,100,678 | 3/1992 | Reed et al. | 426/3 |
| 5,120,550 | 6/1992 | Van der Schueren | 426/3 |
| 5,139,798 | 8/1992 | Yatka et al. | 426/5 |
| 5,165,943 | 11/1992 | Patel et al. | 426/3 |
| 5,165,944 | 11/1992 | Song et al. | 426/5 |
| 5,167,972 | 12/1992 | Greenberg et al. | 426/3 |
| 5,169,657 | 12/1992 | Yatka et al. | 426/5 |
| 5,169,658 | 12/1992 | Yatka et al. | 426/5 |
| 5,171,589 | 12/1992 | Richey et al. | 426/5 |
| 5,178,889 | 1/1993 | Reed et al. | 426/3 |
| 5,192,562 | 3/1993 | Grey et al. | 426/4 |

FOREIGN PATENT DOCUMENTS

| | | | |
|---|---|---|---|
| 0082670 | 6/1983 | European Pat. Off. | A23G 3/30 |
| 0236271 | 9/1987 | European Pat. Off. | A61K 9/68 |
| 0252874 | 1/1988 | European Pat. Off. | A23G 3/30 |
| 0301628 | 2/1989 | European Pat. Off. | C12N 9/10 |
| 0325090 | 7/1989 | European Pat. Off. | A23G 3/30 |
| 0337889 | 10/1989 | European Pat. Off. | A23G 1/236 |
| 0351972 | 1/1990 | European Pat. Off. | A23G 3/30 |
| 0351973 | 1/1990 | European Pat. Off. | A23L 1/236 |
| 0368451 | 5/1990 | European Pat. Off. | C08B 30/18 |
| 0390438 | 10/1990 | European Pat. Off. | A23G 3/00 |
| 0397027 | 11/1990 | European Pat. Off. | A01N 43/08 |
| 0398465 | 11/1990 | European Pat. Off. | C08B 37/00 |

(List continued on next page.)

OTHER PUBLICATIONS

*"Polymer Handbook"*, Second Edition, by Bandrup & Immergut, John Wiley & Sons, Inc. (1975), pp. IV-337 to IV-375.

(List continued on next page.)

FOREIGN PATENT DOCUMENTS

| | | | |
|---|---|---|---|
| 0421670 | 4/1991 | European Pat. Off. | A23G 3/30 |
| 0425115 | 5/1991 | European Pat. Off. | A23G 3/30 |
| 0438912 | 7/1991 | European Pat. Off. | A23L 1/308 |
| 0449594 | 10/1991 | European Pat. Off. | A23L 1/0526 |
| 0457098 | 11/1991 | European Pat. Off. | A23L 1/307 |
| 0472428 | 2/1992 | European Pat. Off. | A23G 3/30 |
| 0566174 | 10/1993 | European Pat. Off. | A23G 3/30 |
| 2626583 | 8/1989 | France | C12P 19/44 |
| 2115461 | 3/1971 | Germany | A23G 3/30 |
| 58-138355 | 8/1983 | Japan | A23L 1/236 |
| 60-224449 | 11/1985 | Japan | A23G 3/30 |
| 61-173748 | 6/1986 | Japan | A23G 3/30 |
| 62-146562 | 6/1987 | Japan | A23G 3/30 |
| 62-148496 | 7/1987 | Japan | C07H 15/4 |
| 1-19860 | 4/1989 | Japan | A23G 3/30 |
| 2-100695 | 4/1990 | Japan | C12P 19/14 |
| 2-154664 | 6/1990 | Japan | A23L 1/308 |
| 3-20301 | 1/1991 | Japan | C08B 37/00 |
| 3-47831 | 7/1991 | Japan | A23L 1/308 |
| 3-47832 | 7/1991 | Japan | A23L 1/308 |
| 347376 | 4/1931 | United Kingdom . | |
| 378073 | 8/1932 | United Kingdom | A23G 3/30 |
| 2063268 | 11/1979 | United Kingdom | C13K 13/00 |
| 2066639 | 11/1979 | United Kingdom | A23L 1/236 |
| 84-01693 | 5/1984 | WIPO | A23G 3/30 |
| 89-03170 | 4/1989 | WIPO . | |
| 90-06061 | 6/1990 | WIPO | A23G 3/30 |
| 90-06317 | 6/1990 | WIPO | C07H 15/04 |
| 90-07859 | 7/1990 | WIPO . | |
| 90-07864 | 7/1990 | WIPO . | |
| 91-03147 | 3/1991 | WIPO . | |
| 92-10943 | 7/1992 | WIPO | A23G 3/30 |

OTHER PUBLICATIONS

Raftilose, "Oligofructose", by Raffinerie Tirlemontoise S. A. and Tiense Suikerraffinaderij N. V.

"Soluble & Insoluble Bulking Agents, Prospects & Applications", by Smits and Norman, presented at IBC Bulking Agents Conference (Mar. 13, 1991).

"Textbook of Polymer Science", Second Edition, by Billmeyer, Jr., John Wiley & Sons, Inc. (1971), pp. 23–61.

L. A. Dreyfus Company—List of Known Gum Base Compositions, 7 pp., Aug. 25, 1994.

PROCESS FOR MANUFACTURING WAX-FREE CHEWING GUMS WITH FAST SET-UP TIMES

RELATED APPLICATIONS

This application is a continuation-in-part of International Application No. PCT/US92/11317, filed on Dec. 30, 1992, which in turn is a continuation-in-part of International Application No. PCT/US92/09615, filed on Nov. 6, 1992, which in turn is a continuation-in-part of PCT/US92/01686, filed on Mar. 3, 1992. All of the above are incorporated herein by reference.

FIELD OF THE INVENTION

The present invention relates to an improved process for manufacturing a wax-free chewing gum, which process is more efficient, has less waste, and provides for fast set-up time and to chewing gum products obtained thereby.

BACKGROUND OF THE INVENTION

U.S. Pat. No. 3,984,574, issued to Comollo, discloses an abhesive chewing gum base in which the non-tack properties were achieved by eliminating conventional chewing gum base ingredients which were found to contribute to chewing gum tackiness, and by substituting non-tacky ingredients in place of the conventional ingredients. Specifically, it was discovered that three classes of materials account for conventional chewing gum tackiness. These materials are elastomers, resins, and waxes.

Comollo eliminated natural and some synthetic elastomers from chewing gum base, and substituted in their place one or more non-tacky synthetic elastomers such as polyisobutylene, polyisoprene, isobutylene-isoprene copolymer and butadiene-styrene copolymer. Comollo also eliminated the tack-producing natural resins and modified natural resins and used instead relatively high amounts of hydrogenated or partially hydrogenated vegetable oils or animal fats. Finally, Comollo completely excluded waxes from the gum base, but included polyvinyl acetate, fatty acids, and mono and diglycerides of fatty acids. Comollo made no mention of improved processing efficiencies.

SUMMARY OF THE INVENTION

The present invention is directed to an improved and more efficient method of manufacturing a wax-free chewing gum containing a wax-free chewing gum base which is free of hydrocarbon-containing waxes and the fast setting chewing gums prepared therefrom. The gum base of the invention can include quantities of synthetic elastomer, elastomer plasticizer, filler and softener, and, like the gum base of Comollo, is substantially free of wax. However, the gum base of the invention is not limited to use in a non-tack chewing gum and may, therefore, contain optional quantities of natural elastomer and/or natural resins. The gum base of the invention may also contain optional quantities of minor ingredients such as color and antioxidant. Certain combinations of elastomers, and certain selections of elastomer plasticizer and softeners contribute to the fast setting wax-free gums and the improved process for making these wax-free chewing gums, as in this invention.

Although, the use of natural elastomers in the gum base compliments certain chewing gum flavors, such as mint oil, by rounding out the otherwise harsh or grassy notes in the flavor, the natural elastomers of this invention are lower in concentration than in earlier wax-free chewing gums. The presence of natural elastomers and natural resins in the gum base also contributes to improved chewing gum texture and flavor retention, and are retained optionally in this invention.

There is currently a need or desire in the chewing gum industry for gum bases which are devoid or substantially free of hydrocarbon-containing waxes and which contain desired quantities of natural elastomers, natural resins, or both, and for improved manufacturing procedures therefor.

With the foregoing in mind, it is a feature and advantage of the invention to provide a method of manufacturing a substantially wax-free chewing gum having a rapid set-up time.

It is also a feature and advantage of the invention to provide improved chewing gums which contain wax-free chewing gum bases, which chewing gums may be formed more efficiently into sticks, coated pillows, or balls.

It is also a feature and advantage of the invention to provide improved chewing gums made by said inventive method which method does not require long tempering and set-up times and still provide a chewing gum having soft initial bite.

It is also a feature and advantage of the invention to provide improved wax-free chewing gums that may be produced more efficiently and with less wastage, less trim gum recycle, and more quickly.

It is also a feature of the invention to provide a method and formulation to produce a wax-free chewing gum having a soft bite and fast set-up time, said method permitting faster and more efficient production and throughput, and less wastage than processes previously operating to produce wax containing or wax-free chewing gums.

It is also a feature and advantage of the invention to provide chewing gum products having desirable properties such as soft initial bite, flavor quality and strength, flavor and sweetness retention, breath freshening, dental and oral health properties and good shelf stability.

The foregoing and other features and advantages will become further apparent from the following detailed description of the presently preferred embodiments, when read in conjunction with the accompanying examples. It should be understood that the detailed description and examples are illustrative rather than limitative, the scope of the present invention being defined by the appended claims and equivalents thereof.

DETAILED DESCRIPTION OF THE PRESENTLY PREFERRED EMBODIMENTS

Figure 1:
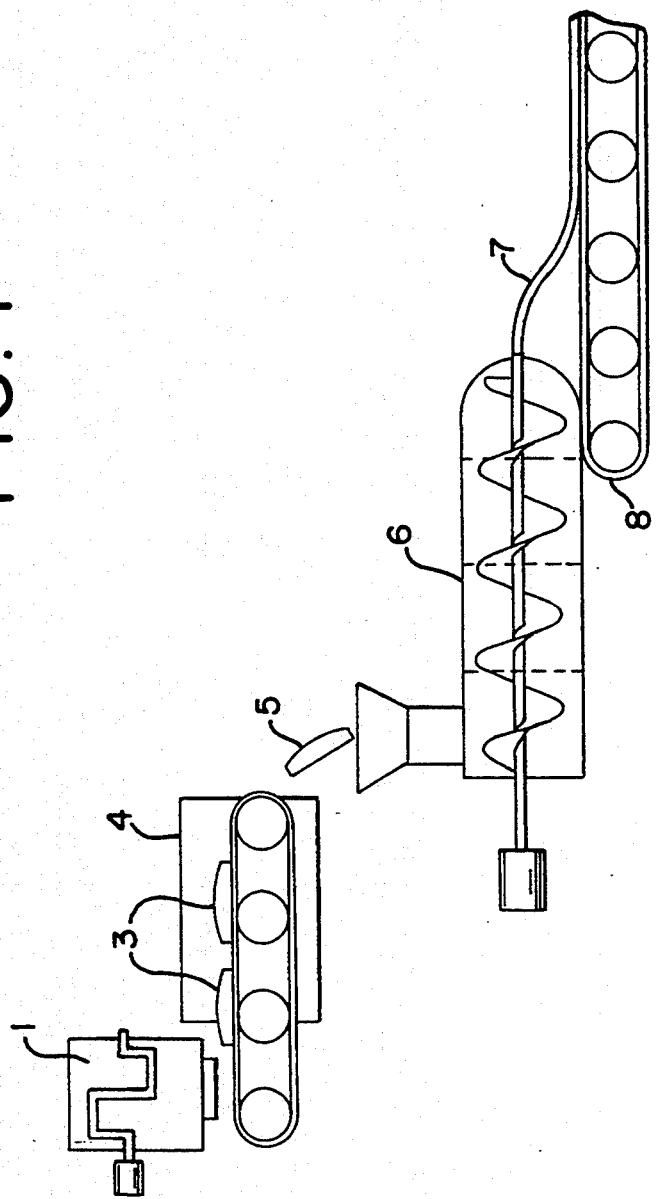
FIG. 1 illustrates an embodiment of an arrangement for the Mixer, the Extruding Device, Conveyor Belt and Continuous Gum Ribbon.
Figure 2A:
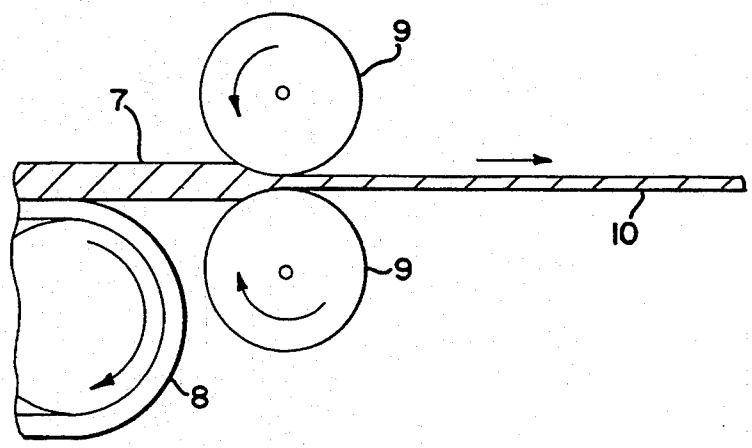
FIG. 2A illustrates an arrangement of the smooth surfaced Initial Reduction Rollers, their counter rotating operation, and their height adjustment and juxtapositioning to control the Nip distance.
Figure 2B:
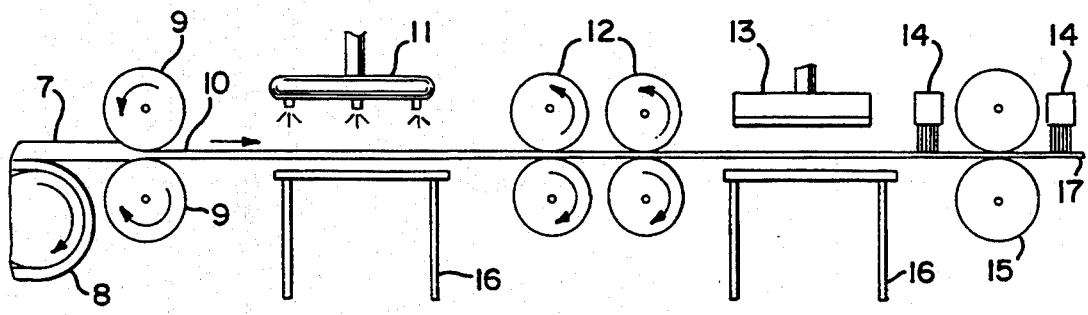
FIG. 2B illustrates an embodiment of an arrangement for operating the Initial Reduction Rollers to obtain a flattened continuous gum ribbon, and an arrangement having three pairs of Reduction rollers, along with transport tables, rolling compound application, metal detectors, the ribbon's direction of travel, roller rotation and the like to obtain a final flattened gum ribbon.
Figure 3A:
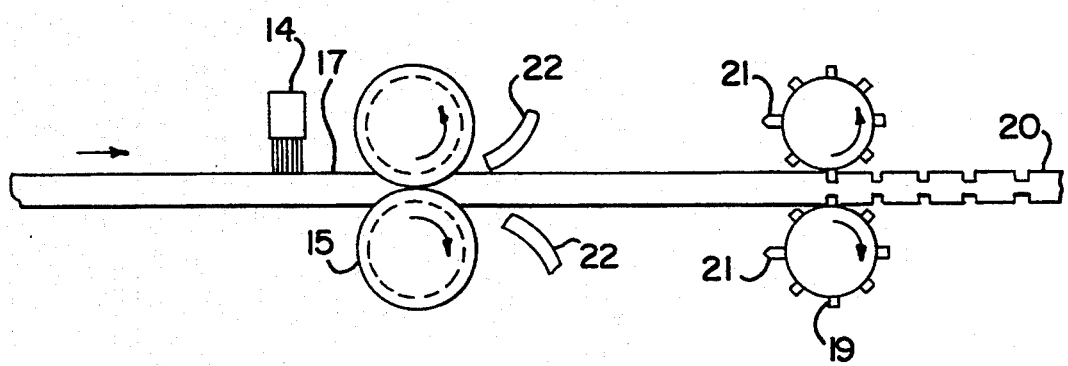
FIGS. 3A and B illustrate an arrangement for the longitudinal scoring and edge cutting rollers and latitudinal scoring and cutting rollers, operating in side view and top view to provide, respectively, a parallel scored smooth edged ribbon and a cross scored and cut gum sheet.
Figure 3B:
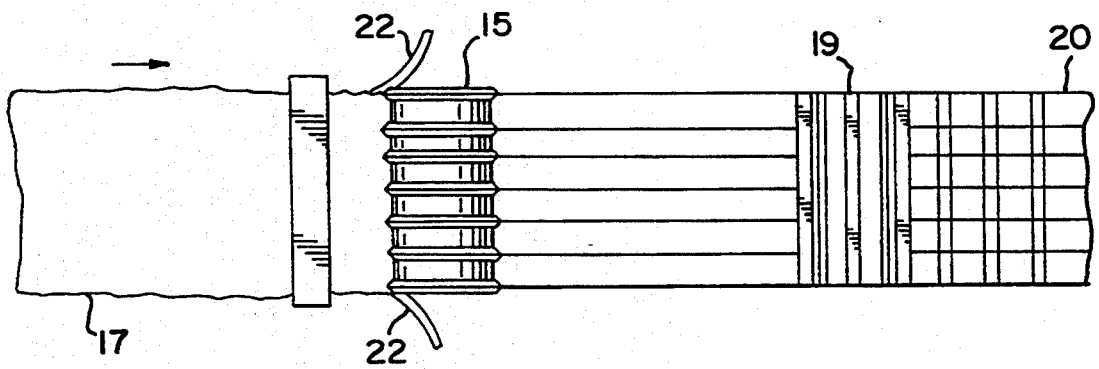
FIG. 3C illustrates an embodiment for the "land" and land thickness.
Figure 3C:
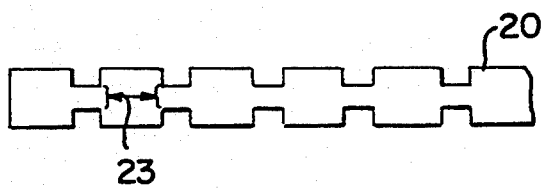

In accordance with the invention, a wax-free chewing gum base is provided for use in either non-tack or conventional wax-free chewing gums, which gums may be either bubble gums or regular chewing gums. The chewing gum base of the invention contains about 20 to about 60 weight percent synthetic elastomer, 0 to about 30 weight percent natural elastomer, about 5 to about 55 weight percent elastomer plasticizer, about 4 to about 40 weight percent filler, about 5 to about 40 weight percent softener, and optional minor amounts (about one percent or less) of miscellaneous ingredients such as colorants, antioxidants, etc; and is free of mineral waxes such as petroleum waxes.

Synthetic elastomers may include, but are not limited to, polyisobutylene or polyisoprene with GPC molecular weight of about 10,000 to about 95,000, isobutylene-isoprene copolymer (butyl elastomer), styrene-butadiene copolymers having styrene-butadiene ratios of about 1:3 to about 3:1, polyvinyl acetate having G. PC molecular weight of about 2,000 to about 90,000, polyethylene, vinyl acetate-vinyl laurate copolymer having vinyl laurate content of about 5 to about 50 percent by weight of the copolymer, and combinations thereof. Preferred combinations are binary or tertiary combinations of styrene-butadiene copolymer, polyisobutylene, and isobutylene-isoprene copolymer. The most preferred combination is a tertiary combination of all three of these elastomers, which may then be blended with vinyl polymers like polyvinyl acetate, polyethylene, or the vinyl acetate-vinyl laureate copolymer, or combinations thereof.

Other preferred characteristics of the elastomers are, for polyisobutylene, 50,000 to 80,000 GPC molecular weight, for styrene-butadiene, 1:1 to 1:3 bound styrene-butadiene, for polyvinyl acetate, 10,000 to 65,000 GPC molecular weight with the higher molecular weight polyvinyl acetates typically used in bubble gum base, and for vinyl acetate-vinyl laurate, vinyl laurate content of 10–45 percent.

Natural elastomers, when used in this invention may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, chiquibul, crown gum, pendare, venezuelau chicle, leche de vaca, niger gutta, tunu, chilte and combinations thereof. The preferred natural elastomers are jelutong, chicle, sorva and massaranduba balata. The preferred elastomers and elastomer concentrations vary depending on whether the chewing gum in which the base is used is abhesive or conventional, bubble gum or regular gum, as discussed below.

Elastomer plasticizers may include, but are not limited to, natural rosin esters such as glycerol esters of partially hydrogenated rosin, glycerol esters of polymerized rosin, glycerol esters of partially dimerized rosin, glycerol esters of rosin, glycerol ester oft tall oil rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; natural terpene resin; and any suitable combinations of the foregoing. The preferred elastomer plasticizers will also vary depending on the specific application, and on the type of elastomer or mixture of elastomers which is used. For example, use of terpene resin to wholly or partially replace ester gums will cause the gum base to be less tacky.

The term "wax-free" as used herein refers to the exclusion of waxes which contain mineral hydrocarbons. Natural waxes such as carnauba wax, bees wax, rice bran wax, and candellila wax do not contain mineral hydrocarbons and are therefor acceptable for use in the chewing gum base and chewing gums prepared therefrom. Most preferably, the chewing gum processes of this invention use no natural waxes, or if used, limit the use to no more than 5 weight percent of the gum base.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Fats, Oils, Softeners/emulsifiers may include tallow, hydrogenated tallow, hydrogenated and partially hydrogenated vegetable oils, cocoa butter, glycerol monostearate, glycerol diacetate (also known as diacetin) glycerol triacetate (also referred to as triacetin), lecithin, mono-, di- and tri glycerides, acetylated mono glycerides, fatty acids (e.g. stearic, palmitic, oleic and linoleic acids), lanolin, and combinations thereof. Hydrogenated or partially hydrogenated vegetable oils are generally preferred, either alone or particularly in combination with other softeners such as the glycerol stearate esters, triacetin, diacetin and lecithin. Of particular value in forming gum bases useful in the improved process are the vegetable oils or tallows with higher melting points, that is, melting points above about 40° C., either alone or in combination with glycerol stearate, triacetin or other softeners.

Colorants and whiteners may include FD&C-type dyes and lakes, fruit and vegetable extracts, titanium dioxide, cocoa powder and combinations thereof.

The wax-free gum base of the invention may also contain optional ingredients such as antioxidants. Because of the rapid set up, the lower temperature of operation, and increased efficiency of our process, we believe the antioxidant may be lowered to as much as 10–80 percent of the levels normally required to manufacture wax containing chewing gums.

When the wax-free gum base of the invention is to be used in a regular (non-bubble) gum which has at least some abhesive (reduced tack) characteristics, the base should contain about 10 to about 40 weight percent synthetic elastomer, about 15 to about 30 weight percent elastomer plasticizer, about 5 to about 30 weight percent filler, about 15 to about 35 weight percent softener, 0 to about 1 weight percent colorant and 0 to about 0.1 weight percent antioxidant. Specific embodiments of the wax-free gum base are provided in Examples 1–30 below.

TABLE 1

Wax-Free Gum Bases
For Use In Chewing Gum Having
Some Reduced Tack Characteristics (Examples 1-30)

| IDENTIFICATION - EXAMPLE #: | EXAMPLES 1-5 | | | | | EXAMPLES 6-10 | | | | | EXAMPLES 11-15 | | | | |
|---|---|---|---|---|---|---|---|---|---|---|---|---|---|---|---|
| GENERIC INGREDIENTS | 1 | 2 | 3 | 4 | 5 | 6 | 7 | 8 | 9 | 10 | 11 | 12 | 13 | 14 | 15 |
| SYNTHETIC ELASTOMER | | | | | | | | | | | | | | | |
| STYRENE-BUTADIENE, ELASTOMER | 5.3 | — | 2.1 | 1.3 | 1.8 | — | — | — | 5.2 | 2.1 | 4.3 | 5.9 | 3.9 | — | 2.1 |
| BUTYL (ISOPRENE-ISOBUTYLENE) ELASTOMER | 8.6 | 7.9 | 7.2 | 14.8 | — | 8.1 | 14.6 | 9.4 | 4.1 | 7.2 | 6.2 | 6.9 | 5.3 | 9.3 | 6.0 |
| POLYISOBUTYLENE ELASTOMER | 7.1 | — | 7.4 | 5.2 | 24.8 | 3.6 | 1.2 | 13.0 | 5.9 | 7.3 | 6.4 | 2.0 | 12.7 | 12.1 | 8.5 |
| POLYVINYL ACETATE | 10.5 | 27.2 | 15.3 | 12.1 | 10.1 | 27.5 | 26.2 | 22.3 | 25.7 | 15.3 | 21.8 | 24.8 | 14.9 | 21.4 | 15.3 |
| ELASTOMER PLASTICIZERS | | | | | | | | | | | | | | | |
| GLYCEROL ESTERS OF ROSIN | 2.1 | — | 19.0 | — | 3.7 | — | 4.9 | — | — | 19.1 | 2.6 | 8.6 | — | — | 10.1 |
| GLYCEROL ESTERS OF PART HYD ROSIN | 4.3 | 18.2 | — | 15.3 | 7.9 | — | 12.6 | — | 23.5 | — | — | 8.0 | — | — | 8.9 |
| TERPENE RESINS | 10.8 | — | — | — | 7.1 | 27.1 | — | 10.0 | 3.2 | — | 17.1 | 1.9 | 21.4 | 6.5 | — |
| FILLER | | | | | | | | | | | | | | | |
| CALCIUM CARBONATE | — | 15.9 | 20.7 | — | 17.7 | 10.9 | — | 20.0 | 15.1 | 20.7 | — | 9.9 | 13.7 | 21.4 | 20.9 |
| TALC | 25.5 | — | — | 16.7 | — | — | 13.1 | — | — | — | 14.6 | 7.2 | 1.4 | — | — |
| SOFTENER | | | | | | | | | | | | | | | |
| HYDROGENATED VEGETABLE OIL | 15.3 | 22.6 | 24.3 | 28.4 | 21.0 | 14.3 | 16.6 | 20.7 | 12.2 | 24.3 | 19.5 | 21.1 | 18.7 | 25.2 | 24.2 |
| GLYCEROL MONOSTEARATE | 8.2 | 7.4 | 4.0 | 5.1 | 3.5 | 4.8 | 9.6 | 4.6 | 5.1 | 4.0 | 4.4 | 3.7 | 5.7 | 4.1 | 4.0 |
| LECITHIN | 2.3 | 0.8 | — | 1.1 | 2.4 | 3.7 | 1.2 | — | — | — | 3.1 | — | 2.3 | — | — |
| TOTAL PERCENT | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |

| IDENTIFICATION - EXAMPLE #: | EXAMPLES 16-20 | | | | | EXAMPLES 21-25 | | | | | EXAMPLES 26-30 | | | | |
|---|---|---|---|---|---|---|---|---|---|---|---|---|---|---|---|
| GENERIC INGREDIENTS | 16 | 17 | 18 | 19 | 20 | 21 | 22 | 23 | 24 | 25 | 26 | 27 | 28 | 29 | 30 |
| SYNTHETIC ELASTOMER | | | | | | | | | | | | | | | |
| STYRENE-BUTADIENE, ELASTOMER | 1.6 | — | 2.7 | — | — | — | 1.4 | 3.2 | — | 4.1 | — | — | — | — | — |
| BUTYL (ISOPRENE-ISOBUTYLENE) ELASTOMER | 3.7 | 8.1 | 2.3 | 8.9 | 3.6 | 7.4 | 8.4 | 7.3 | 8.8 | 11.3 | 10.0 | 9.2 | 2.4 | 8.3 | 8.8 |
| POLYISOBUTYLENE ELASTOMER | 6.8 | 3.6 | 14.2 | 10.0 | 11.1 | 1.9 | 1.6 | 7.5 | 3.5 | 7.9 | 1.9 | 6.3 | 8.4 | 3.6 | 2.3 |
| POLYVINYL ACETATE | 22.3 | 27.3 | 17.3 | 21.3 | 21.9 | 24.8 | 23.1 | 21.1 | 27.9 | 18.2 | 27.6 | 13.1 | 20.5 | 27.5 | 27.4 |
| ELASTOMER PLASTICIZERS | | | | | | | | | | | | | | | |
| GLYCEROL ESTERS OF ROSIN | 9.9 | — | — | — | 19.6 | — | 13.1 | 15.3 | — | — | — | — | — | — | — |
| GLYCEROL ESTERS OF PART HYD ROSIN | 4.3 | — | 27.3 | — | 11.2 | — | 22.1 | 2.4 | — | 26.2 | 25.3 | 19.9 | 23.5 | 25.3 | 28.3 |
| TERPENE RESINS | 11.6 | 26.9 | — | 9.7 | 3.7 | 25.8 | 3.6 | 5.8 | 27.4 | 1.4 | — | — | — | — | — |
| FILLER | | | | | | | | | | | | | | | |
| CALCIUM CARBONATE | — | 11.3 | — | 21.5 | 6.4 | 18.6 | — | — | 11.9 | 13.6 | 11.3 | 22.3 | — | 11.3 | 12.5 |
| TALC | 17.2 | — | 8.2 | — | — | — | 7.3 | 14.8 | — | — | — | — | 15.6 | — | — |
| SOFTENER | | | | | | | | | | | | | | | |
| HYDROGENATED VEGETABLE OIL | 17.8 | 14.3 | 22.4 | 23.2 | 19.2 | 12.3 | 11.3 | 19.8 | 12.3 | 8.2 | 15.4 | 18.6 | 19.2 | 16.5 | 12.5 |
| GLYCEROL MONOSTEARATE | 4.8 | 4.8 | 2.7 | 5.4 | 3.3 | 4.4 | 4.4 | 2.8 | 4.7 | 5.2 | 4.8 | 10.6 | 8.9 | 4.8 | 4.7 |
| LECITHIN | — | 3.7 | 2.9 | — | — | 4.8 | 3.7 | — | 3.5 | 3.9 | 3.7 | — | 1.5 | 2.7 | 3.5 |
| TOTAL PERCENT | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |

When the wax-free gum base of the invention is to be used in a regular (non-bubble) gum which does not have abhesive characteristics, the base should contain about 12 to about 30 weight percent natural elastomer, about 20 to about 40 weight percent synthetic elastomer, about 4 to about 25 weight percent elastomer plasticizer, about 5 to about 25 weight percent filler, about 15 to about 30 weight percent softener, 0 to about 1 weight percent colorant and 0 to about 0.1 weight percent antioxidant. Specific embodiments of the wax-free gum base fitting this description are provided in Examples 31–55 below:

TABLE 2

Wax-Free Gum Bases For Use In Chewing Gum Not Having Reduced Tack (Examples 31–55)

| IDENTIFICATION - EXAMPLE #: | EXAMPLES 31–34 | | | | EXAMPLES 35–38 | | | |
|---|---|---|---|---|---|---|---|---|
| GENERIC INGREDIENTS | 31 | 32 | 33 | 34 | 35 | 36 | 37 | 38 |
| NATURAL ELASTOMER | | | | | | | | |
| NATURAL GUM | 22.0 | 26.5 | 23.4 | 25.1 | 22.8 | 18.2 | 23.5 | 17.6 |
| SYNTHETIC ELASTOMER | | | | | | | | |
| STYRENE-BUTADIENE ELASTOMER | — | — | — | 1.9 | 2.6 | — | — | — |
| BUTYL (ISOPRENE-ISOBUTYLENE) ELASTOMER | 4.8 | 7.1 | 5.6 | 2.1 | 4.1 | 6.9 | 8.8 | 10.2 |
| POLYISOBUTYLENE ELASTOMER | 5.7 | 5.6 | 3.0 | 4.7 | 3.2 | 5.4 | 3.3 | 2.1 |
| POLYVINYL ACETATE | 16.4 | 18.7 | 19.8 | 24.8 | 16.3 | 15.2 | 12.9 | 26.9 |
| ELASTOMER PLASTICIZERS | | | | | | | | |
| GLYCEROL ESTERS OF ROSIN | 3.8 | — | — | 3.2 | 6.9 | — | 8.5 | 11.7 |
| GLYCEROL ESTERS OF PART HYD ROSIN | 12.3 | 15.3 | 15.9 | 12.6 | 11.8 | 12.5 | 5.5 | 4.8 |
| METHYL ESTERS OF ROSIN | — | — | — | 2.1 | 1.7 | 2.6 | 1.4 | — |
| TERPENE RESINS | — | — | — | — | — | — | 3.7 | — |
| FILLER | | | | | | | | |
| CALCIUM CARBONATE | — | 4.0 | 10.7 | 4.4 | 9.3 | 16.0 | — | — |
| TALC | 7.1 | — | — | — | — | — | 9.3 | 4.6 |
| SOFTENER | | | | | | | | |
| HYDROGENATED VEGETABLE OIL | 21.8 | 18.4 | 16.8 | 12.6 | 18.2 | 16.1 | 16.2 | 15.8 |
| GLYCEROL MONOSTEARATE | 6.1 | 4.4 | 4.8 | 3.8 | — | 7.1 | 5.7 | 6.3 |
| LECITHIN | — | — | — | 2.7 | 3.1 | — | 1.2 | — |
| TOTAL PERCENT | 100.0 | 100.0 | 100.0 | 100.0 | 100.0 | 100.0 | 100.0 | 100.0 |
| IDENTIFICATION - EXAMPLE #: | EXAMPLES 39–42 | | | | EXAMPLES 43–46 | | | |
| GENERIC INGREDIENTS | 39 | 40 | 41 | 42 | 43 | 44 | 45 | 46 |
| NATURAL ELASTOMER | | | | | | | | |
| NATURAL GUM | 12.9 | 18.5 | 15.7 | 22.6 | 23.7 | 22.1 | 21.1 | 22.2 |
| SYNTHETIC ELASTOMER | | | | | | | | |
| STYRENE-BUTADIENE ELASTOMER | — | — | 1.9 | — | — | — | — | — |
| BUTYL (ISOPRENE-ISOBUTYLENE) ELASTOMER | 9.1 | 6.4 | 3.7 | 5.8 | 6.2 | 5.7 | 6.1 | 5.7 |
| POLYISOBUTYLENE ELASTOMER | 9.4 | 5.2 | 4.1 | 3.1 | 5.9 | 3.1 | 2.8 | 3.1 |
| POLYVINYL ACETATE | 10.7 | 15.4 | 26.2 | 20.4 | 23.7 | 22.0 | 18.0 | 22.0 |
| ELASTOMER PLASTICIZERS | | | | | | | | |
| GLYCEROL ESTERS OF ROSIN | 15.2 | — | — | — | — | — | 15.7 | — |
| GLYCEROL ESTERS OF PART HYD ROSIN | — | 13.2 | 15.3 | 11.7 | 11.3 | 15.2 | — | 13.2 |
| METHYL ESTERS OF ROSIN | — | 2.0 | — | 4.0 | 2.9 | — | — | 2.0 |
| TERPENE RESINS | — | — | — | — | 2.8 | — | — | — |
| FILLER | | | | | | | | |
| CALCIUM CARBONATE | 20.6 | 18.5 | 12.2 | 11.6 | 5.6 | 11.4 | — | 11.3 |
| TALC | — | — | — | — | — | — | 15.4 | — |
| SOFTENER | | | | | | | | |
| HYDROGENATED VEGETABLE OIL | 15.8 | 13.9 | 15.1 | 17.5 | 12.1 | 17.2 | 15.1 | 17.2 |
| GLYCEROL MONOSTEARATE | 6.3 | 6.9 | 5.8 | 3.3 | 5.8 | 3.3 | 5.8 | 3.3 |
| LECITHIN | — | — | — | — | — | — | — | — |
| TOTAL PERCENT | 100.0 | 100.0 | 100.0 | 100.0 | 100.0 | 100.0 | 100.0 | 100.0 |
| IDENTIFICATION - EXAMPLE #: | EXAMPLES 47–50 | | | | EXAMPLES 51–55 | | | |
| GENERIC INGREDIENTS | 47 | 48 | 49 | 50 | 51 | 52 | 53 | 54 | 55 |
| NATURAL ELASTOMER | | | | | | | | | |
| NATURAL GUM | 23.8 | 28.4 | 18.7 | 19.5 | 14.4 | 18.2 | 25.2 | 25.2 | 26.7 |
| SYNTHETIC ELASTOMER | | | | | | | | | |
| STYRENE-BUTADIENE ELASTOMER | — | — | — | — | — | — | — | — | — |
| BUTYL (ISOPRENE-ISOBUTYLENE) ELASTOMER | 3.1 | 5.4 | 6.9 | 8.2 | 9.1 | 6.8 | 2.4 | 3.5 | 3.2 |
| POLYISOBUTYLENE ELASTOMER | 7.7 | 3.1 | 5.5 | 2.7 | 3.6 | 5.4 | 4.9 | 5.7 | 6.1 |
| POLYVINYL ACETATE | 20.5 | 26.6 | 14.8 | 17.2 | 18.1 | 15.5 | 19.9 | 19.1 | 17.6 |
| ELASTOMER PLASTICIZERS | | | | | | | | | |
| GLYCEROL ESTERS OF ROSIN | — | — | — | 20.0 | 11.9 | — | 15.6 | — | — |
| GLYCEROL ESTERS OF PART HYD ROSIN | 10.4 | 11.4 | 15.5 | — | 13.0 | 12.7 | — | 15.6 | 15.6 |
| METHYL ESTERS OF ROSIN | 2.0 | — | — | — | — | 2.6 | — | — | — |
| TERPENE RESINS | 5.1 | — | — | — | — | — | 2.1 | 1.9 | — |
| FILLER | | | | | | | | | |
| CALCIUM CARBONATE | — | 9.1 | 17.9 | 9.6 | 14.1 | 15.7 | — | — | — |
| TALC | 5.3 | — | — | — | — | — | 7.1 | 6.2 | 8.0 |

TABLE 2-continued

Wax-Free Gum Bases For Use
In Chewing Gum Not Having Reduced Tack (Examples 31–55)

| SOFTENER | | | | | | | | | |
|---|---|---|---|---|---|---|---|---|---|
| HYDROGENATED VEGETABLE OIL | 15.8 | 16.0 | 13.0 | 22.8 | 15.8 | 16.0 | 18.4 | 18.4 | 18.4 |
| GLYCEROL MONOSTEARATE | 6.3 | — | 7.7 | — | — | 7.1 | 4.4 | 4.4 | 2.8 |
| LECITHIN | — | — | — | — | — | — | — | — | 1.6 |
| TOTAL PERCENT | 100.0 | 100.0 | 100.0 | 100.0 | 100.0 | 100.0 | 100.0 | 100.0 | 100.0 |

When the wax-free gum base of the invention is to be used in a bubble gum, the base should contain about 30 to about 60 weight percent synthetic elastomer, about 5 to about 55 weight percent elastomer plasticizer, about 10 to about 35 weight percent filler, about 5 to about 25 weight percent softener, 0 to about 1 weight percent colorant and 0 to about 0.1 weight percent antioxidant. Specific embodiments of the wax-free base for use in bubble gum are provided in Examples 56–74 below.

can usually be achieved in one to four hours, depending on the formulation. The final mass temperature can be between 60° C. and 150° C., more preferably between 80° C. and 120° C. The completed molten mass is emptied from the mixing kettle into coated or lined pans, extruded or cast into any desirable shape and allowed to cool and solidify.

Although the above method for making base is typical and applies to both chewing and bubble bases, it has

TABLE 3

Wax-Free Gum Bases For Use In Bubble Gum

| IDENTIFICATION - EXAMPLE #: | EXAMPLES 56–60 | | | | | EXAMPLES 61–64 | | | |
|---|---|---|---|---|---|---|---|---|---|
| GENERIC INGREDIENTS | 56 | 57 | 58 | 59 | 60 | 61 | 62 | 63 | 64 |
| SYNTHETIC ELASTOMER | | | | | | | | | |
| POLYISOBUTYLENE ELASTOMER | 17.1 | 16.7 | 11.7 | 6.2 | 11.6 | 15.7 | 13.2 | 5.4 | 7.9 |
| POLYVINYL ACETATE | 24.9 | 25.6 | 29.4 | 30.9 | 31.5 | 32.1 | 33.2 | 34.8 | 34.2 |
| ELASTOMER PLASTICIZERS | | | | | | | | | |
| GLYCEROL ESTERS OF ROSIN | 6.8 | 8.0 | 10.7 | 14.6 | 19.8 | 27.4 | 22.6 | 16.3 | 14.8 |
| GLYCEROL ESTERS OF PART HYD ROSIN | — | — | — | — | — | — | — | — | — |
| FILLER | | | | | | | | | |
| CALCIUM CARBONATE | — | — | — | — | — | — | — | 30.2 | 29.8 |
| TALC | 34.7 | 34.9 | 34.1 | 34.0 | 21.9 | 10.1 | 17.3 | — | — |
| SOFTENER | | | | | | | | | |
| GLYCERYL TRIACETATE | 4.6 | 3.9 | 4.4 | 4.7 | 5.0 | 4.9 | 5.0 | 5.3 | 5.3 |
| GLYCEROL MONOSTEARATE | 5.8 | 5.7 | 4.3 | 4.6 | 4.9 | 4.7 | 4.1 | 5.9 | 5.0 |
| ACETYLATED MONOGLYCERIDE | 6.1 | 5.2 | 5.4 | 5.0 | 5.3 | 5.1 | 4.6 | 2.1 | 3.0 |
| TOTAL PERCENT | 100.0 | 100.0 | 100.0 | 100.0 | 100.0 | 100.0 | 100.0 | 100.0 | 100.0 |
| IDENTIFICATION - EXAMPLE #: | EXAMPLES 65–69 | | | | | EXAMPLES 70–74 | | | |
| GENERIC INGREDIENTS | 65 | 66 | 67 | 68 | 69 | 70 | 71 | 72 | 73 | 74 |
| SYNTHETIC ELASTOMER | | | | | | | | | |
| POLYISOBUTYLENE ELASTOMER | 17.2 | 13.0 | 11.6 | 11.6 | 7.9 | 11.6 | 10.9 | 11.6 | 12.4 | 11.9 |
| POLYVINYL ACETATE | 37.3 | 37.1 | 39.9 | 41.2 | 34.2 | 37.8 | 37.5 | 31.4 | 31.0 | 37.0 |
| ELASTOMER PLASTICIZERS | | | | | | | | | |
| GLYCEROL ESTERS OF ROSIN | 11.2 | — | — | — | — | — | — | — | — | — |
| GLYCEROL ESTERS OF PART HYD ROSIN | — | 19.8 | 19.9 | 19.4 | 14.8 | 19.8 | 20.6 | 19.8 | 21.1 | 20.3 |
| FILLER | | | | | | | | | |
| CALCIUM CARBONATE | 20.6 | 16.5 | 15.0 | — | 29.8 | — | — | — | — | — |
| TALC | — | — | — | 14.0 | — | 17.0 | 19.5 | 22.7 | 22.2 | 16.7 |
| SOFTENER | | | | | | | | | |
| GLYCERYL TRIACETATE | 5.6 | 5.6 | 6.0 | 6.2 | 5.3 | 5.6 | 5.2 | 5.8 | 4.3 | 5.7 |
| GLYCEROL MONOSTEARATE | 8.1 | 8.0 | 7.6 | 7.6 | 5.0 | 3.2 | 3.1 | 2.9 | 2.5 | 4.5 |
| ACETYLATED MONOGLYCERIDE | — | — | — | — | 3.0 | 5.0 | 3.2 | 5.8 | 6.5 | 3.9 |
| TOTAL PERCENT | 100.0 | 100.0 | 100.0 | 100.0 | 100.0 | 100.0 | 100.0 | 100.0 | 100.0 | 100.0 |

The wax-free gum base of the invention constitutes about 10–90 weight percent of the chewing gum, more typically 15–40 weight percent of the chewing gum, and most commonly 20–35 weight percent of the chewing gum. The gum base is typically prepared by adding an amount of the elastomer, elastomer plasticizers and filler to a heated sigma blade mixer with a front to rear blade speed ratio of typically 2:1. The initial amounts of ingredients are determined by the working capacity of the mixing kettle in order to attain a proper consistency. After the initial ingredients have massed homogeneously, the balance of the elastomer plasticizer, filler, softeners, etc. are added in a sequential manner until a completely homogeneous molten mass is attained. This been found that there is a preferred method for making the bubble bases described in this invention.

First, all of the polyvinyl acetate and portions of the polyisobutylene and filler are added and blended in a heated sigma blade mixer. Softeners such as glycerol triacetate and/or acetylated monoglyceride are then added along with a second portion of each of polyisobutylene and filler. The acetylated monoglyceride may be added at the end of the process if desired and still not alter the chewing texture of the gum made from the base.

Next, the rest of the polyisobutylene (and/or other elastomers) and filler are added along with the elastomer plasticizer. Finally, the remaining ingredients such as glycerol monostearate and antioxidants may be added. Colorant may be added at any time during the mixing process and is preferably added at the start.

There are some variations to the above described preferred method which in no way limits the method as described. Those skilled in the art of gum base manufacture may be able to appreciate any minor variations.

In producing wax containing gumbases high in polyvinyl acetate, and particularly those high in high molecular weight polyvinyl acetate, it is advantageous to improve blending of the ingredients by removing the heat applied to the sigma blade mixer at some point in the process. This reduces the temperature of the gum base and causes greater compatibility of its ingredients. In the inventive gum base process for making the inventive gum base free of wax, there is no need to remove the heat applied. The degree of incompatibility is greatly reduced since there is no wax present. Nevertheless, heat is preferably removed at about 30 minutes to about 90 minutes into the mixing time of the base production process.

In addition to the water-insoluble gum base, a typical chewing gum composition includes a water soluble bulk portion and one or more flavoring agents. The wax-free gum base of the invention can be used in any typical chewing gum composition.

The water soluble portion of the chewing gum may include softeners, bulk sweeteners, high intensity sweeteners, flavoring agents and combinations thereof. Water soluble or water dispersible softeners are added to the chewing gum in order to optimize the chewability and mouth feel of the gum. The softeners, which are also known as plasticizers or plasticizing agents, generally constitute between about 0.5-15 percent by weight of the chewing gum. The softeners may include glycerin, lecithin, glycerol monostearate, hydroxylated lecithin, agar, carrageenan, and combinations thereof. Aqueous sweetener solutions such as those containing sorbitol, hydrogenated starch hydrolyzates, corn syrup and combinations thereof, may also be used as softeners and binding agents in chewing gum.

Bulk sweeteners constitute between 5.0 to 90.0 percent by weight of the chewing gum, more typically 20-80 percent by weight of the chewing gum and most commonly 30-70 percent by weight of the chewing gum. Bulk sweeteners may include both sugar and sugarless sweeteners and sweetening components. Sugar sweeteners may include saccharide containing components including but not limited to sucrose, dextrose, maltose, dextrin, dried invert sugar, fructose, levulose, galactose, corn syrup solids, high maltose syrup, invert-/high fructose syrup, maltotriose, glyceraldehyde, erythrose, xylose, lactose, leucrose, L-sugars, fructooligosaccharide and low calorie bulking agents such as indigestible dextrin, guar gum hydrolyzate, oligofructose, polydextrose, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolyzates, maltitol, lactitol, erythritol, cellobiitol, and the like, alone or in combination.

High intensity sweeteners may also be present and are commonly used with sugarless sweeteners. When used, high intensity sweeteners typically constitute between 0.001-5.0 percent by weight of the chewing gum, preferably between 0.01-1.00 percent by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, stevia and the like, alone or in combination.

Often, in wax-free chewing gums, the removal of wax requires the addition of binders. Binders can include the bulk sweeteners such as corn syrup. In preferred low moisture formulations permitting rapid set-up, at least a portion if not all of the binder is a coevaporated Lycasin[1] syrup containing about 20-30 weight percent glycerin, 5-10 weight percent water, and the remainder hydrogenated starch hydrolyzate (HSH) solids.

[1]Lycasin is a trademark of the Roquette-Freres Company.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

Flavoring agents should generally be present in the chewing gum in an amount within the range of about 0.1-15 percent by weight of the chewing gum, preferably between about 0.2-5 percent by weight of the chewing gum, most preferably between about 0.5-3 percent by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

Optional ingredients such as colors, food acidulants, emulsifiers, pharmaceutical agents, vitamins, and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base, filtering the molten gum mass to remove any insolubles, and adding it to the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

The benefits of the invention are predominantly found after the chewing gum is mixed in the mixer with a wax-free chewing gum base, water soluble bulking (sweeteners, binding agents, and optionally certain water soluble softeners and binders, for example glycerin, lecithin and coevaporated glycerin/hydrogenated starch hydrolyzates) and flavoring agents. Preferably, the wax-free gum base is manufactured as described above, using at least two, and preferably at least three synthetic elastomers, and may contain some natural elastomers as well. In terms of elastomer content, the wax-free gum base comprises styrene-butadiene, from about 0-20 weight percent of the gum base; polyisobutylene, from about 20-60 weight percent of gum base; and isobutylene-isoprene copolymer (butyl elastomer), from about 0-40 weight percent of the gum base. The elastomers may also contain vinyl polymers, such as polyvinyl acetate. Additionally, the gum base further comprises hydrogenated or partially hydrogenated vegetable oil, from about 10-35 weight percent of gum base; elastomer plasticizers selected from glycerol esters of rosin, glycerol esters of partially hydrogenated rosin, terpene resins, or mixtures thereof, as long as the total elastomer plasticizer amount ranges from about 10-40 weight percent of the gum base. The gum base also contains fillers, preferably from about 15-30 weight percent; and other softeners (besides the vegetable oils above) selected from glycerol stearate esters, triacetin, glycerol stearate and lecithin, or mixtures thereof, preferably from about 0.5 to about 10 weight percent of the gum base.

The gum base is admixed in the Mixer (1) with bulking agents, such as sweeteners, and water soluble softeners and binders, as above described to form the original chewing gum mixture.

The process then releases the chewing gum mixture to a flat surface (2) as a raw gum loaf (3). The gum loaf normally weighs between 10 and 30 pounds.

The original wax containing chewing gum mixture normally contains trim gum (from 15-50 percent) and exits the mixer at temperatures above about 45° C., often as high as 45°-50° C. However, with the preferred wax-free chewing gum formulations, it is possible and preferred to mix the chewing gum ingredients at lower temperatures, i.e. about 38°-44° C., in the absence of or with greatly lowered amounts of trim gum (about 0-20 weight percent).

These raw gum loaves are then tempered for about 10 to about 30 minutes in a controlled temperature, controlled humidity environment (4), and then the tempered loaves (5) are fed into the extruder (6). One of the advantages of the invention is that the wax-free chewing gum loaves only require from about 10-30 minutes to be tempered, preferably less than 15 minutes compared to 35 min. to an hour for normal wax containing gums.

The tempered gum loaves enter the extruder (6) and are mixed. The inlet temperature of the extruder ranges from about 40°±5° C. whereas the exit temperature of the extruder is at about 60° C.±3° C., or about 17° C. to about 23° C. higher than the inlet temperature. At this temperature the gum is sufficiently fluid to be extruded. The temperature of extrusion for a wax-free gum is about 3°-5° C. higher than that required for a wax containing gum. As the semi-fluid and extruded gum exits the extruder, it does so in the shape of a relatively thick continuous gum strip or ribbon (7) and at a temperature of about 50° C.±5° C. A conveyor belt (8) collects the ribbon and moves the ribbon down the process line. The gum strip also cools and becomes less fluid.

The gum ribbon is typically from about 0.5 inches to about 3.0 inches thick and from about 12.0 to about 25 inches wide.

The ribbon of chewing gum is carried on the belt for a distance to the initial reduction rollers (9). The ribbon is fed into the nip of the initial reduction rollers (9). The upper and lower reduction rollers both rotate in the direction of the flow of the ribbon and act upon the ribbon to decrease its thickness. The flattened ribbon (10) exiting the nip of the initial reduction rollers is now from about 0.200 inches to about 0.500 inches thick, and about 20 to about 27.5 inches wide.

After the initial reduction rollers, described above, where the greatest decrease in ribbon thickness is achieved, the process may also include at least one other set of reduction rollers (12), preferably two sets or more, and at least one set of so called "finishing" rollers (15) to further decrease the thickness of the flattened gum ribbon (17) to achieve the desired commercial thickness.

Intermittently, a rolling compound is added, via an applicator (11), to at least one, or both, surfaces of the continuous or flattened gum ribbon. These rolling compounds are powdered, dry compounds, which are chosen to provide a non-stick surface during rolling and thickness reduction. The rolling compound used can be selected from the group consisting of sucrose, mannitol, starch, calcium carbonate, talc, lactitol, palatinit (hydrogenated isomaltulose), lactose, and combinations thereof. The preferred rolling compounds are dried and powdered sweeteners, such as powdered sucrose or powdered mannitol. The excess rolling compound that accumulate on the surface of the ribbon are normally brushed away by brushes (14) and then the brushed ribbon surface is scored or cut before wrapping. For safety purposes, a metal detector (13) may also be aligned with the gum ribbon.

In the production of a stick gum, the final brushed ribbon enters two sets of scoring and cutting rollers. The first set, (18) referred to as the longitudinal scoring rollers contain a multitude of circularly parallel ribs on the surface of each roller. As the ribbon enters the nip of these longitudinal scoring rollers, a multitude of parallel indentations are formed on the upper and lower surfaces of the ribbon, thereby forming the so-called "land". (23) The "land" ranges in thickness between about 0.018 to about 0.030 inches.

Each ribbon is transcribed with from about 9 to about 30 parallel indentations, spaced equally from one another across the width of the ribbon. The longitudinal rollers also have, at each edge, raised ribs, such that each edge is essentially thereby cut to form a smooth edge. The gum removed from the edge cut is referred to as trim gum, (22) although trim gum may also include any other wastage from the process.

The parallel scored ribbon then enters the nip of the latitudinal scoring rollers (19). These rollers also contain a multitude of parallel raised ribs, each set to score the gum ribbon at essentially right angles to the length and edges of the ribbon forming lands from 0.001 to about 0.005 inches thicker than the longitudinal lands. At least one set of raised ribs (21) on the latitudinal rollers are of such height as to cut the ribbon once in every full rotation of the latitudinal scoring/cutting rollers.

The result of the gum ribbon passing through the longitudinal and latitudinal scoring and cutting rollers is a series of essentially quadrilaterally scored gum sheets

(20) whereon there is scored a series of lands (23) setting out essentially the commercial dimensions of the gum sticks, or in another embodiment, the pelleted gum pieces, to be separated and wrapped or packaged.

Each longitudinally/latitudinally scored sheet is then collected and stacked in sheet stacks of from 8 to about 12 sheets, preferably 9–10 sheets. These stacks are normally stored on wooden trays, and must be tempered at from 6 hours to about 12 hours. Pellet gum sheets are stacked from 2 to 4 sheets high and tempered from about 10 to about 24 hours. The tempering operation normally is at a temperature of from 65° F. to about 75° F. and a relative humidity (R.H.) of from about 35–50 percent at the tempering temperature.

Normally, chewing gums formulated with petroleum waxes require a final tempering operation of from about 18 to about 48 hours (stick gum from 18–24 hours, pellet gum from 24–48 hours) before the gum has sufficient toughness and strength to be successfully wrapped, coated, or packaged. The wax-free gums of our invention achieve processing toughness and strength within 6–12 hours for stick gum and within 10–24 hours for a pellet gum sheet. This is referred to a fast set-up time, or rapid tempering and permits early wrapping. Tempering times are decreased from 10% to about 60% of the time required for wax containing gums.

The new wax-free chewing gum process is therefore more efficient and produces the wax-free gum of our invention more efficiently and quickly. Since gum base blending times are essentially the same for wax or wax-free gums, and since chewing gum mixing of gum base, water soluble bulking and sweetening agents, and flavors are also about the same, the fact that the new wax-free gums can provide gum sheets that temper to acceptable toughness and strength in from 10 to about 60% of the normal time greatly increases the amount of gum made in any given time.

Also, as earlier taught, the original chewing gum loaf is tempered at lower temperatures than with wax containing gums and more quickly, i.e., from 10–25 minutes, preferably less than about 15 minutes, vs. from 35 minutes to an hour for wax containing gums. This also contributes to a more efficient operation.

With the preferred wax-free, gum bases described above, and with the use of the preferred sweeteners, bulking agents, binders and water soluble softeners, and most particularly when the chewing gums formed thereby are low moisture gums containing less than about 2.0 wt. percent water, our process manufactures a wax-free stick chewing gum having a Taber Stiffness from about 15 to about 55 Taber Units. This is at least 5 percent less than a comparable wax gum. The wax-free gums also have a rapid set up or tempering time allowing as much as about 10 hours to about 24 hour reduction in total process time for the same amount of gum (compared to wax containing gums), and still having and maintaining an initial soft bite. Our wax-free gums also have superior storage stability.

Figure 4A:
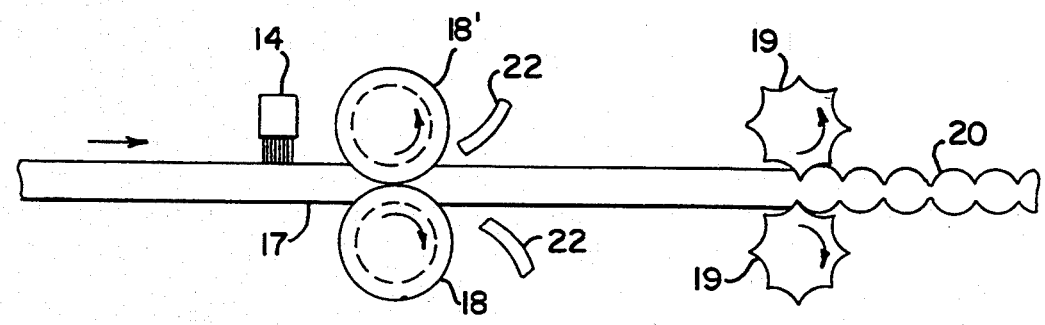
FIG. 4 illustrates an arrangement for both longitudinal and latitudinal scalloped scoring and cutting rollers used to produce pelleted and coated gums.
Figure 4B:
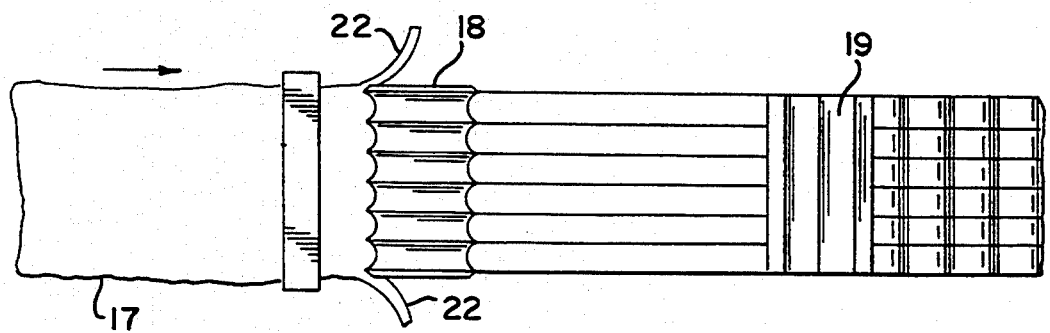
Figure 4C:
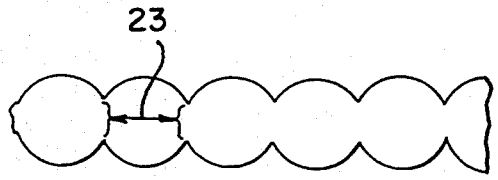

As earlier described, the improved process above is somewhat different when a pelleted, coated gum product is desired. (See FIG. 4) The longitudinal/latitudinal (18) (19) scoring and cutting rollers are designed in a way to provide for the formation of essentially rectangular gum pillows. This calls for an escalloped shape to the surface of these rollers and modifications of the distances between the land forming ribs. Also, the final brushed ribbon (17) is thicker, preferably from about 0.150 to about 0.300 inches thick when entering the scoring and cutting rollers, most preferably from about 0.018 to about 0.025 inches thick.

The sheets (20) formed are accordingly thicker than the sheets used to form stick gum. The sheets are rectangularly scored, but also appear as multiply connected gum pillows, almost a quilted effect. However, the wax-free gums still provide the toughness needed to stack the pillowed/pelleted sheets from 2–4 sheets high, preferably about 3 sheets high, and still avoid the flattening of the pillowed shapes scored into the gum sheet used for pelleted products. The tempering of these thickened sheets requires from about 10 to 24 hours, compared to the 24–48 hours normally required.

Again, the wax-free chewing gums of the invention temper quickly, provide more efficient product production, which, in this case, also avoids pellet flattening during tempering. By avoiding the flattening of pellets during stacking and tempering, the gum pellets are now effectively broken into individual gum pellets, with fewer so-called "doubles" formed during the coating process. The coating process has been earlier described, but normally involves pouring or spraying a sweetener syrup or concentrate onto the gum pellet, usually in a tumbling system, and drying to a hard sweetener or coated shell. If the pellets have flattened during the stacking and tempering stages, the flattened surfaces have an increased tendency to stick together, flat side to flat side, during the coating process to form "doubles" or "triples". This leads to process waste and inefficient recovery of final coated and pelleted product, since the "doubles" or "triples" must be discarded or recycled.

Chewing gum products contemplated as part of the present invention are generally similar to products using traditional wax containing bases. Many general types of products can be produced including reduced tack gums, sugarless gums, bubble gums (sugarless or sugar-containing), coated ball or pellet gums (sugarless or sugar-containing), dental health gums, breath freshening gums, novelty gums, low calorie gums and pharmaceutical gums. The products may be of any flavor, and may be processed in a variety of ways in either batch or continuous processes, and formed into any final shape including sticks, tabs, chunks, tapes, coextruded products, molded shapes, etc.

The following formulas are illustrative of types of products which may be produced. All ingredient levels are expressed in weight percent.

Examples 75–98 illustrate non-tack and reduced-tack chewing gums of the present invention. As can be seen, there is much latitude in the selection of flavors sweeteners and ingredient levels. Examples 75–86 illustrate use of the invention with sugar gums while Examples 87–98 describe sugarless gums. Encapsulated sweeteners are used to extend sweetness and flavor and to protect the artificial sweetener from degradation during storage. Examples 89 and 91 are low moisture products having moisture levels below 2 percent.

TABLE 4

Sugar-Containing
Non-Tack And Reduced Tack Gums

EXAMPLES 75–80

TABLE 4-continued

Sugar-Containing Non-Tack And Reduced Tack Gums

| Example | 75 | 76 | 77 | 78 | 79 | 80 |
|---|---|---|---|---|---|---|
| Base Example # | 19 | 17 | 11 | 19 | 16 | 16 |
| Base % | 20.12 | 23.20 | 27.20 | 21.22 | 22.10 | 24.00 |
| Flavor | 0.20 (Spray Dried Peppermint) | 1.10 (Cinnamon) | 1.55 (Wintergreen) | 0.10 (Spray Dried Menthol) | 0.10 (Peppermint) | 0.90 (Peppermint) |
| Flavor | 0.91 (Spearmint) | | 0.10 (Spray Dried Menthol) | 0.85 (Spearmint) | 0.90 (Spearmint) | 0.10 (Spearmint) |
| Sugar | 58.70 | 60.96 | 55.80 | 60.60 | 60.34 | 61.29 |
| Sorbitol | 1.20 | 0.68 | | 0.68 | 0.70 | |
| Encapsulated Acesulfame K | 0.10 | 0.30 | | 0.30 | 0.41 | |
| Encapsulated Aspartame | 0.10 | | | | | |
| Calcium Carbonate | 3.10 | | | | | |
| Corn Syrup* | 13.47 | 12.11 | 13.71 | 14.80 | 14.00 | 12.10 |
| Lecithin | | 0.15 | 0.10 | 0.15 | 0.15 | 0.20 |
| Glycerin | 2.10 | 1.50 | 1.54 | 1.30 | 1.30 | 1.41 |
| TOTAL | 100 | 100 | 100 | 100 | 100 | 100 |

*A low moisture chewing gum may be manufactured by substituting for the corn syrup, the glycerin evaporated Lycasin, or glycerin-HSH syrups earlier described.

EXAMPLES 81–86

| Example | 81 | 82 | 83 | 84 | 85 | 86 |
|---|---|---|---|---|---|---|
| Base Example # | 6 | 11 | 20 | 22 | 13 | 16 |
| Base % | 18.72 | 22.81 | 26.01 | 19.35 | 26.00 | 24.77 |
| Flavor | 0.81 (Fruit Flavor) | 1.11 (Peppermint) | 0.97 (Spearmint Oil) | 1.21 (Cinnamon Flavor) | 1.30 (Fruit Flavor) | 1.21 (Wintergreen Flavor) |
| Flavor | | | 0.12 (Peppermint Oil) | 0.13 (Peppermint Oil) | | |
| Sugar | 57.25 | 54.86 | 51.10 | 60.31 | | 51.85 |
| Palatinose | | | | | 49.86 | |
| Corn Syrup* | 14.26 | 11.88 | 13.70 | 14.08 | 15.07 | 13.62 |
| Dextrose | 7.28 | 8.11 | 6.37 | 3.55 | 6.11 | 7.41 |
| Lecithin | 0.13 | 0.12 | 0.10 | | 0.05 | 0.10 |
| Glycerol Monostearate | 0.40 | | 0.61 | | | |
| Glycerin | 1.15 | 1.11 | 1.02 | 1.37 | 1.61 | 1.04 |
| TOTAL | 100 | 100 | 100 | 100 | 100 | 100 |

*A low moisture chewing gum can be manufactured by substituting glycerin coevaporated Lycasin for the corn syrup.

TABLE 5

Sugarless Non-Tack And Reduced Tack Gums
EXAMPLES 87–92

| | 87 | 88 | 89 | 90 | 91 | 92 |
|---|---|---|---|---|---|---|
| Base Example # | 3 | 19 | 7 | 24 | 24 | 8 |
| Base % | 24.00 | 27.11 | 21.21 | 29.48 | 22.58 | 18.11 |
| Flavor | 1.07 (Citris Oils) | 0.98 (Peppermint) | 0.97 (Spearmint Oil) | 1.15 (Peppermint Oil) | 1.47 (Cinnamon Flavor) | 1.00 (Wintergreen Oil) |
| Flavor | | 0.20 (Spray Dried Menthol) | 0.15 (Peppermint Oil) | 0.21 (Spearmint Oil) | | 0.27 (Peppermint Oil) |
| Sorbitol | 51.00 | 55.06 | 55.70 | 55.15 | 48.00 | 57.53 |
| Calcium Carbonate | | | 2.11 | | 2.00 | 4.70 |
| Sorbitol Solution | 6.42 | | | | | |
| Coevaporated Lycasin (7.5% water, 26% glycerin) | 10.37 | 9.16 | 4.00 | 8.11 | 12.01 | 8.88 |
| Glycerin | 4.70 | 4.11 | 12.11 | 3.11 | 11.61 | 7.10 |
| Mannitol | 2.10 | 3.10 | 3.11 | 2.66 | 2.00 | 2.00 |

TABLE 5-continued

Sugarless Non-Tack And Reduced Tack Gums
EXAMPLES 87-92

| | Example | | | | | |
|---|---|---|---|---|---|---|
| | 87 | 88 | 89 | 90 | 91 | 92 |
| Encapsulated Aspartame | 0.19 | | 0.25 | | | 0.21 |
| Free Aspartame | 0.05 | | 0.10 | | | 0.10 |
| Encapsulated Alitame | | 0.05 | | 0.10 | | |
| Free Alitame | | | | 0.03 | | |
| Encapsulated Sucralose | | | | | 0.21 | |
| Free Sucralose | | 0.08 | | | 0.02 | |
| Lecithin | 0.10 | 0.15 | 0.20 | | 0.10 | 0.10 |
| TOTAL | 100 | 100 | 100 | 100 | 100 | 100 |

TABLE 6

Reduced And Regular Tack Low Calorie Gums
EXAMPLES 93-98

| | Example | | | | | |
|---|---|---|---|---|---|---|
| | 93 | 94 | 96 | 98 | 97 | 98 |
| Base Example # | 6 | 3 | 19 | 13 | 52 | 44 |
| Base % | 19.2 | 24.7 | 19.2 | 24.0 | 19.2 | 19.2 |
| Sorbitol | | 6.0 | | | | |
| Mannitol | | 1.0 | | | | |
| Corn Syrup* | | | 6.0 | 24.6 | 18.5 | 6.0 |
| Dextrose | | | 10.0 | | 10.0 | 10.0 |
| Lactose | | | 5.0 | | | 5.0 |
| Glycerin | 2.0 | 16.4 | 8.9 | 0.4 | 1.4 | 8.9 |
| Lecithin | | 0.2 | | | | |
| Flavor | 1.0 | 1.4 | 0.9 | 1.0 | 0.9 | 0.9 |
| Oligofructose | | | 50.0 | 50.0 | | |
| Fructooligo-saccharide | | | | | 50.0 | 50.0 |
| Color | | 0.05 | | | | |
| Aspartame | | 0.25 | | | | |
| High Mol. Weight Indigestible Dextrin | 57.8 | | | | | |
| Low Mol. Weight Indigestible Dextrin | | 50.0 | | | | |
| Indigestible Dextrin Syrup** | | 20.0 | | | | |
| TOTAL | 100 | 100 | 100 | 100 | 100 | 100 |

*Corn syrup may be partially or wholly substituted by glycerin coevaporated Lycasin.
**Indigestible dextrin syrup may also be coevaporated with glycerin to achieve a softener/binder for use in the gums of this invention.

Examples 99-104 are sugarless products made with the non-reduced-tack bases of the present invention. Examples 105-110 are equivalent sugar products.

TABLE 7

Regular Tack Sugarless Gums
EXAMPLES 99-104

| | Example | | | | | |
|---|---|---|---|---|---|---|
| | 99 | 100 | 101 | 102 | 103 | 104 |
| Base Example # | 32 | 44 | 51 | 36 | 52 | 44 |
| Base % | 21.76 | 22.07 | 24.00 | 20.97 | 26.00 | 20.08 |
| Flavor | 0.92 (Peppermint Oil) | 0.77 (Spearmint Oil) | 0.83 (Spearmint Oil) | 0.99 (Cinnamon Flavor) | 0.97 (Peppermint Oil) | 1.04 (Peppermint Oil) |
| Flavor | | 0.24 (Peppermint Oil) | | | | 0.16 (Spray Dried Menthol) |
| Sorbitol | 46.54 | | | 63.61 | 51.50 | |
| Coevaporated Lucasin (7.6% Water, 25% Glycerin) | 8.47 | 7.84 | 11.20 | 7.76 | | |
| Glycerin | 5.19 | 4.91 | 2.10 | 4.20 | 12.00 | |
| Mannitol | 1.77 | | | 2.01 | 3.11 | |
| Xylitol | 15.11 | | 12.11 | | 6.27 | 78.16 |
| Palatinit (Hydrogenated Isomaltulose) | | 63.97 | 49.60 | | | |
| Aspartame | | | | 0.14 | | 0.14 |
| Encapsulated Aspartame | | | | 0.22 | | 0.22 |
| Alitame | | 0.02 | 0.02 | | | |
| Encapsulated Alitame | | 0.04 | 0.04 | | | |
| Sucralose | 0.11 | | | | 0.15 | |
| Lecithin | 0.13 | 0.14 | 0.10 | 0.10 | | 0.20 |

TABLE 7-continued

Regular Tack Sugarless Gums
EXAMPLES 99–104

| | Example | | | | | |
|---|---|---|---|---|---|---|
| | 99 | 100 | 101 | 102 | 103 | 104 |
| TOTAL | 100 | 100 | 100 | 100 | 100 | 100 |

TABLE 8

Regular Tack Sugar Gums
EXAMPLES 105–110

| | Example | | | | | |
|---|---|---|---|---|---|---|
| | 105 | 106 | 107 | 108 | 109 | 110 |
| Base Example # | 57 | 52 | 44 | 39 | 51 | 40 |
| Base % | 22.38 | 20.60 | 20.08 | 23.11 | 20.02 | 21.01 |
| Flavor | 0.89 (Peppermint Oil) | 0.58 (Spearmint Oil) | 0.86 (Peppermint Oil) | 0.91 (Peppermint Oil) | 1.21 (Fruit Flavor) | 0.98 (Wintergreen Flavor) |
| Flavor | | | | 0.21 (Spearmint Oil) | | 0.20 (Spray Dried Menthol) |
| Encapsulated Aspartame | | | | 0.10 | | |
| Encapsulated Acesulfame K | | | | | 0.15 | |
| Sucralose | | | | | | 0.09 |
| Sugar | 58.39 | 59.49 | 62.66 | 59.97 | 63.59 | 62.51 |
| Corn Syrup* | 17.20 | 18.50 | 15.40 | 14.70 | 13.88 | 14.19 |
| Glycerin | 1.09 | 0.83 | 1.00 | 1.00 | 1.05 | 1.02 |
| Lecithin | 0.05 | | | | .10 | |
| TOTAL | 100 | 100 | 100 | 100 | 100 | 100 |

*Corn syrup may be partially or completely substituted for by use of glycerin coevaporated MSH (Lycasin)

Examples 111–122 are examples of inventive coated pellet gums made with non-wax bases. The gum products of these examples are formed into pellets or balls for subsequent coating. Examples 111–116 are sugar pellets which could be coated with sugar syrups. Such syrups may contain modified starch (0 to 6.0 percent), compatible flavors and colors (0 to 0.30 percent), vegetable gums such as gum arabic and cellulose derivatives such as hydroxypropyl methyl cellulose (0 to 20 percent) in addition to sucrose or starch hydrolyzate in an aqueous solution.

Examples 117–122 are sugarless pellets which can be coated with sugar alcohol solutions such as those of sorbitol, xylitol and palatinit. These syrups may also contain the same modifiers listed above for sugar syrups.

In both cases (sugar and sugarless) dry coating agent (sugar or sugar alcohol) may be added between layers of coating syrup, a process known as dry charging or soft panning.

Coating may be carried out by any suitable process, most often using a conventional pan, side vented pans, high capacity pans such as those made by Driam or Dumouline, or by continuous panning techniques.

TABLE 9

Sugar Pellet Gums for Coating
EXAMPLES 111–116

| | Example | | | | | |
|---|---|---|---|---|---|---|
| | 111 | 112 | 113 | 114 | 115 | 116 |
| Base Example # | 40 | 38 | 37 | 51 | 62 | 47 |
| Base % | 24.32 | 24.28 | 24.30 | 24.27 | 25.17 | 24.33 |
| Flavor | 0.55 (Spearmint Oil) | 0.73 (Peppermint Oil) | 2.66 (Licorice Powder) | 0.77 (Fruit Flavor) | 0.47 (Spearmint Oil) | 0.61 (Spearmint Oil) |
| Flavor | | | 0.60 (Menthol/Anethol) | | 0.15 (Peppermint Oil) | |
| Sugar | 52.97 | 52.87 | 50.94 | 52.85 | 52.59 | 52.84 |
| Corn Syrup* | 22.16 | 22.12 | 21.60 | 22.11 | 21.62 | 22.22 |
| TOTAL | 00 | 100 | 100 | 100 | 100 | 100 |

*Corn syrup may contain a portion of glycerin coeveporated Lycasin. Corn syrup may also be high solids corn syrup or corn syrup solids.

TABLE 10

Sugarless Pellet Gums For Coating
EXAMPLES 117–122

| | Example | | | | | |
|---|---|---|---|---|---|---|
| | 117 | 118 | 119 | 120 | 121 | 122 |
| Base Example # | 33 | 26 | 40 | 29 | 35 | 35 |
| Base % | 31.01 | 33.00 | 32.71 | 33.03 | 30.97 | 31.45 |
| Flavor | 1.20 (Spearmint Oil) | 1.30 (Peppermint Oil) | 1.09 (Spearmint Oil) | 1.50 (Fruit Flavor) | 1.01 (Peppermint Oil) | 1.31 (Fruit Flavor) |
| Flavor | | 0.60 (Menthol) | 0.17 (Peppermint Oil) | 0.50 (Lemon Flavor) | 0.21 (Spray Dried Menthol) | 1 |
| Sorbitol | 51.46 | 44.06 | 45.56 | 43.81 | 48.69 | 45.99 |
| Calcium Carbonate | 10.01 | 13.00 | 12.16 | 12.93 | 13.04 | 13.33 |
| Glycerin | 6.14 | 8.00 | 8.00 | 7.98 | 7.82 | 7.30 |
| Encapsulated Aspartame | 0.12 | 0.14 | 0.21 | 0.25 | 0.18 | 0.62 |
| Free Aspartame | 0.06 | | 0.10 | | 0.08 | |
| TOTAL | 100 | 100 | 100 | 100 | 100 | 100 |

Inventive bubble gums may be prepared using the bubble gum bases of the present invention such as those listed in Examples 56–74. Illustrative formulations are given as Examples 123–134. Examples 123–128 are sugar bubble gum formulas. Note that Examples 124 and 128 use blends of two inventive bases. This is a technique to optimize processing and texture properties while minimizing the necessity of maintaining different bases for each product and without having additional custom bases compounded. Examples 129–134 are sugarless bubble gum formulas.

TBLE 11

Sugar Bubble Gums
EXAMPLES 123–128

| | Example | | | | | |
|---|---|---|---|---|---|---|
| | 123 | 124 | 125 | 126 | 127 | 128 |
| Base Example # | 69 | 72/74 | 74 | 72 | 59 | 72/69 |
| Base % | 24.02 | 11.00/ 11.00 | 22.20 | 20.01 | 19.99 | 9.00/ 13.00 |
| Flavor | 0.80 (Fruit Flavor) | 0.85 (Cream Soda) | 0.60 (Lemon Lime) | 0.60 (Blueberry) | 0.60 (Strawberry) | 0.80 (Cream Soda) |
| Flavor | | 0.03 (Vanilla) | | | | 0.02 (Vanilla) |
| Sugar | 55.10 | 59.54 | 55.95 | 59.00 | 59.75 | 57.98 |
| Corn Syrup* | 17.68 | 16.63 | 19.64 | 17.99 | 16.88 | 17.44 |
| Lecithin | 0.60 | 0.35 | 0.40 | 0.51 | 0.60 | 0.45 |
| Glycerin | 1.74 | 0.70 | 0.40 | 0.81 | 1.49 | 1.31 |
| Color | 0.06 (Red) | - | 0.01 (Green) | 0.48 (Blue) | 0.08 (Red) | |
| Citric Acid | | | 0.90 | 0.60 | 0.70 | |
| TOTAL | 100 | 100 | 100 | 100 | 100 | 100 |

*Corn syrup may be high solids corn syrup, corn syrup solids, or may be partially substituted for by using glycerin co-evaporated Lycasin.

TABLE 12

Sugarless Bubble Gums
EXAMPLES 129–134

| | Example | | | | | |
|---|---|---|---|---|---|---|
| | 129 | 130 | 131 | 132 | 133 | 134 |
| Base Example # | 63 | 64 | 69 | 71 | 71 | 60 |
| Base % | 24.00 | 24.59 | 28.00 | 29.12 | 30.10 | 26.71 |
| Flavor | 1.20 (Fruit Flavor) | 1.41 (Fruit Flavor) | 1.71 (Grape Flavor) | 1.34 (Strawberry Flavor) | 1.11 (Lemon Flavor) | 1.23 (Peach Flavor) |
| Sorbitol | 40.0 | 51.88 | 46.03 | 44.54 | 46.39 | 49.33 |
| Calcium Carbonate | 5.00 | 4.31 | | | | |
| Talc | | | 3.71 | 3.44 | 1.99 | 3.44 |
| Lecithin | 1.00 | 0.91 | 0.84 | 0.61 | 0.86 | 0.75 |
| Citric Acid | | | | 0.31 | 0.31 | |
| Malic Acid | | | 0.21 | 0.11 | 0.31 | 0.16 |
| Tartaric Acid | | | 0.36 | 0.11 | | |

TABLE 12-continued

Sugarless Bubble Gums
EXAMPLES 129-134

| | Example | | | | | |
|---|---|---|---|---|---|---|
| | 129 | 130 | 131 | 132 | 133 | 134 |
| Glycerin | 17.00 | 10.00 | 9.00 | 15.09 | 8.21 | 12.00 |
| Lycasin/ Glycerin | 11.47 | 6.79 | 9.61 | 5.11 | 10.41 | 6.00 |
| Color | 0.02 (Red) | 0.01 (Red) | 0.06 (Red/Blue) | 0.02 (Red) | 0.05 (Yellow) | 0.01 (Red) |
| Encapsulated Aspartame | 0.27 | | 0.41 | | | 0.31 |
| Free Aspartame | 0.04 | | 0.06 | | 0.17 | 0.06 |
| Acesulfame K | | | | 0.11 | | |
| Encapsulated Alitame | | 0.10 | | | | |
| Sucralose | | | | 0.09 | 0.09 | |
| TOTAL | 100 | 100 | 100 | 100 | 100 | 100 |

EXAMPLES 135-150

To demonstrate differences between gum formulas with wax and wax-free bases the following base formulas and gum formulas were made:

| | Example | | | | | |
|---|---|---|---|---|---|---|
| | 135 | 136 | 137 | 138 | 139 | 140 |
| Base Ingredients | | | | | | |
| Mono-crystalline wax | 10.0 | — | 13.0 | — | 6.5 | — |
| Styrene Butadiene | 2.1 | 2.1 | — | — | — | — |
| Isoprene/ Isobutylene | 7.2 | 5.7 | — | — | — | — |
| Polyiso-butylene | 7.4 | 8.9 | 7.0 | 7.9 | 10.8 | 11.9 |
| PVAC | 15.3 | 15.3 | 31.3 | 34.2 | 35.3 | 37.0 |
| Glycerol esterified Resin | 19.1 | 19.1 | 13.0 | 14.8 | 18.5 | 20.3 |
| CaCO3/talc* | 20.6 | 24.0 | 25.1 | 29.8 | 15.9* | 16.7* |
| Hydrogenated Vegetable oil | 14.3 | 21.4 | — | — | — | — |
| Glycerol Monostearate | 4.0 | 3.5 | 5.9 | 5.0 | 7.7 | 4.5 |
| Glycerol triacetate | — | — | 4.7 | 5.3 | 5.3 | 5.7 |
| Acetylated Monogly-cerides | — | — | — | 3.0 | — | 3.9 |

*indicates talc, no * indicates CaCO3

The wax-free base formula for Example 136 is very similar to Example 15 previously shown. The wax-free base formula in Example 138 is the same formula shown previously as Example 69.

The wax-free base formula for Example 136 is very similar to Example 15 previously shown. The wax-free base formula in Example 138 is the same formula shown previously as Example 69.

The wax-free base formula of Example 140 is the same formula shown previously as Example 74.

The gum bases of Examples 135 and 136 were each used to prepare sugar free gum products by the following formulas:

| | Example | | | |
|---|---|---|---|---|
| | 141 | 142 | 143 | 144 |
| Gum Bass of Example | 140 | 141 | 140 | 141 |
| Base | 25.2 | 25.2 | 25.2 | 25.2 |
| Sorbitol | 48.32 | 48.32 | 48.46 | 48.46 |
| Coevaporated Lycosin/ Glycerin | 9.3 | 9.3 | 9.3 | 9.3 |
| Mannitol | 8.0 | 8.0 | 8.0 | 8.0 |
| Glycerin | 7.4 | 7.4 | 7.4 | 7.4 |
| Peppermint Flavor | 1.4 | 1.4 | — | — |
| Spearmint Flavor | — | — | 1.3 | 1.3 |
| Lecithin | 0.13 | 0.13 | 0.13 | 0.13 |
| Encapsulated Aspartame | 0.26 | 0.25 | 0.21 | 0.21 |

After mixing, the gum loaves having the wax-free base were sheeted with less tempering, since they began to set up faster. Sheeting machine adjustments for extrusion temperature were higher and scoring rolls had to be reset in order to properly sheet and score the gum with wax-free base. Even though the gum was softer with wax-free base compared to gum made with wax base, a surface toughness was noted that allowed the gum to be more easily handled after sheeting and before wrapping. Because of this surface toughness, gum could be wrapped sooner after sheeting than could the gum made with wax base. Even though the wax-free gum was softer, it was just as easy to wrap as the wax containing gum.

To demonstrate differences in softness, Taber Stiffness data was taken 2 weeks after manufacture.

| Taber Stiffness (average of 5 sticks) | |
|---|---|
| Example 141 | 56.8 |
| Example 142 | 41.0 |
| Example 143 | 54.2 |
| Example 144 | 32.2 |

Results show that a wax-free gum made with wax-free base gives a softer initial bite than gum made with base containing wax.

The Taber Stiffness is used to measure the stiffness of stick chewing gum. Chewing gum in the pellet form or chunk form, as is the case of most soft bubble gums, is measured for toughness using an Instron physical test.

The Instron measures the force required for a probe to penetrate a piece of chunk gum to a depth of 0.1 inch. Instron data is expressed as work, in pounds-inches.

For Examples 145-146, bases of Examples 137 and 138 were used to make a chunk sugar bubble gum type fruit product according to the following formula.

|  | Example | |
| --- | --- | --- |
|  | 145 | 146 |
| Base of Example | 137 | 138 |
| Base | 24.0 | 24.0 |
| Sugar | 56.04 | 56.04 |
| High maltose syrup | 17.7 | 17.7 |
| Glycerin | 1.8 | 1.8 |
| Fruit Flavor | 0.8 | 0.8 |
| Lecithin | 0.6 | 0.6 |
| Color | 0.06 | 0.06 |
| Instron work, pound-inches | 0.100 | 0.0492 |

For examples 147-150, the bases of Examples 139-140 were used to make a chunk sugar bubble gum having tart flavors according to the following formulas:

|  | Example | | | |
| --- | --- | --- | --- | --- |
|  | Example 147 | Example 148 | Example 149 | Example 150 |
| Base of Example | 139 | 140 | 139 | 140 |
| Base | 22.2 | 22.2 | 20.0 | 20.0 |
| Sugar | 55.99 | 55.99 | 56.95 | 56.95 |
| High maltose syrup | 19.5 | 19.5 | 20.0 | 20.0 |
| Glycerin | 0.4 | 0.4 | 1.0 | 1.0 |
| Lecithin | 0.4 | 0.4 | 0.5 | 0.5 |
| Lemon Flavor | 0.8 | 0.6 | — | — |
| Blueberry Flavor | — | — | 0.6 | 0.8 |
| Citric acid | 0.9 | 0.9 | 0.6 | 0.6 |
| Color | 0.01 | 0.01 | 0.35 | 0.35 |
| Instron, pound-inches | 0.235 | 0.056 | .0437 | .0224 |

As shown by the Instron data, examples 146, 148 and 150 made with wax-free bases have a lower value and thus have a softer initial bite than does a comparable gum made with wax containing base even though the gum formulations are the same.

While the embodiments of the invention disclosed herein are presently considered to be preferred, various modifications and improvements can be made without departing from the spirit and scope of the invention. The scope of the invention is indicated in the appended claims, and all changes that come within the meaning and range of equivalency of the claims are intended to be embraced therein.

I claim:

1. An improved method of making a wax-free chewing gum having an initial soft bite and rapid tempering comprising:
    a) mixing wax-free chewing gum ingredients providing for a chewing gum with a soft bite at least five percent softer than a comparable wax containing gum, thereby forming a raw mixture;
    b) tempering the raw mixture for less than 30 minutes to form a tempered mixture;
    c) forming said tempered mixture into scored gum sheets;
    d) tempering said gum sheets for from 10 percent to about 60 percent of the time required to temper a comparable wax containing gum sheets, thereby forming tempered gum sheets, then
    e) processing the tempered gum sheets to a finished chewing gum product having an initial soft bite.

2. The process of claim 1 wherein the selected wax-free gum ingredients provide a chewing gum having a Taber Stiffness ranging between about 15 Taber Units to about 55 Taber Units.

3. The process of claim 1 wherein the selected wax-free gum ingredients provide a chewing gum having an Instron yield ranging from about 0.02 pound-inches to about 0.08 pound-inches.

4. The process of claim 2 wherein the chewing gum additionally provides an Instron yield ranging from about 0.02 pound-inches to about 0.08 pound-inches.

5. The process of claim 1 wherein the wax-free chewing gum ingredients comprise: a gum base, water soluble ingredients, and flavors, wherein the gum base comprises:

| Ingredient | Wt. percent of gum base |
| --- | --- |
| synthetic elastomers | about 20–60 percent |
| natural elastomers | about 0–30 percent |
| elastomer plasticizer | about 5–55 percent |
| fillers | about 5–40 percent |
| fats, oils, softeners | about 5–40 percent, | and further wherein the water soluble ingredients comprise:

| Ingredient | Wt. percent of bulking agent |
| --- | --- |
| sweeteners selected from high intensity sweetener, low intensity sweeteners, and admixtures thereof; | about 0.01–98 percent |
| water soluble softeners and emulsifiers | 1.0–50 percent |
| binding agents | 1.0–50 percent |

6. A manufacturing process for wax-free chewing gum products having initial soft bite comprising:
    a) mixing selected wax-free chewing gum ingredients, said ingredients selected to obtain a chewing gum having an initial soft bite at least 5 percent softer than that of a comparable wax containing gum, thereby obtaining a raw gum mixture;
    b) forming the raw gum mixture into loaves;
    c) tempering the loaves for from about 10 to about 30 minutes at essentially constant temperature and relative humidity to form tempered loaves;
    d) collecting and blending the tempered loaves into a semi-fluid extrudable gum mass having a temperature at least 5° centigrade above the temperature of the tempered gum loaves;
    e) processing the fluid gum mass into an essentially continuous gum strip;
    f) processing the continuous gum strip into quadrilaterally scored and trimmed gum sheets;
    g) tempering said gum sheets for from about 6 to about 24 hours at an essentially constant selected temperature ranging from about 60° F. to about 80° F. and at an essentially constant relative humidity for the selected temperature ranging from about 35 percent to about 55 percent; thereby obtaining tempered, scored gum sheets; and then h) processing the tempered scored gum sheet into chewing gum products having initial soft bite.

7. The process of claim 6 wherein the selected wax-free gum ingredients provide a chewing gum having a Taber Stiffness ranging between about 15 Taber Units to about 55 Taber Units.

8. The process of claim 6 wherein the selected wax-free gum ingredients provide a chewing gum having an Instron yield ranging from about 0.02 pound-inches to about 0.08 pound-inches.

9. The process of claim 7 wherein the chewing gum additionally provides an Instron yield ranging from about 0.02 pound-inches to about 0.08 pound-inches.

10. The process of claim 6 wherein the wax-free chewing gum ingredients comprise: a gum base, water soluble ingredients, and flavors, wherein the gum base comprises:

| Ingredient | Wt. percent of gum base |
| --- | --- |
| synthetic elastomers | about 20–60 percent |
| natural elastomers | about 0–30 percent |
| elastomer plasticizer | about 5–55 percent |
| fillers | about 5–40 percent |
| fats, oils, softeners | about 5–40 percent, | and further wherein the water soluble ingredients comprise:

| Ingredient | Wt. percent of bulking agent |
| --- | --- |
| sweeteners selected from high intensity sweetener, low intensity sweeteners, and admixtures thereof; | about 0.01–98 percent |
| water soluble softeners and emulsifiers | 1.0–50 percent |
| binding agents | 1.0–50 percent |

11. The process of claim 6 wherein the chewing gum mixture comprises:

| Ingredient | Wt. percent of gum mixture |
| --- | --- |
| a) a wax-free gum base | 15–35 percent |
| b) flavors | 0.1–10.0 percent |
| c) water soluble ingredients | 50–85 percent, | and further wherein the chewing gum mixture comprises from about 0.0 to about 20 weight percent trim gum.

12. The process of claim 11 wherein the chewing gum mixture comprises a wax-free gum base comprising:

| Ingredient | Wt. percent of gum base |
| --- | --- |
| synthetic elastomers | 20–60 percent |
| natural elastomers | 0–30 percent |
| elastomer plasticizer | 5–55 percent |
| fillers | 5–40 percent |
| fats, oils, softeners | 5–40 percent, | and further wherein the water soluble bulking agents comprise:

| Ingredient | Wt. percent of bulking agent |
| --- | --- |
| a) sweeteners selected from the group consisting of high intensity sweeteners, low intensity sweeteners, and mixtures thereof; | 0.01–98 percent |
| b) water soluble softeners and emulsifiers | 1.0–50 percent |
| c) binding agents | 1.0–50 percent |

13. The process of claim 6 wherein, in step c, the loaves are tempered at from about 35° C. to about 45° C.

14. The process of claim 6 wherein, in step c, the loaves are tempered at from about 35° C. percent to about 55 percent relative humidity.

15. The process of claim 6 wherein, in step d, the semi-fluid gum mass is extruded at a gum temperature of from about 45° C. to about 55° C. to form a continuous gum ribbon.

16. The process of claim 6 wherein, in steps e and f, the continuous gum strip is reduced by at least one set of reducing rollers and at least one set of finishing rollers to a thickness of from about 0.05 to about 0.10 inches and then quadrilaterally scored, trimmed, and cut to form gum sheets.

17. The process of claim 6 wherein, in step h, the chewing products are selected from stick gum and coated pelleted gum.

18. The process of claim 6 wherein, in step c, the loaves are tempered at from about 35 percent to about 55 percent relative humidity.

19. The process of claim 6 wherein, in step f, the continuous gum strip is reduced by at least one set of reducing rollers and at least one set of finishing rollers to a thickness of from about 0.05 to about 0.10 inches and then quadrilaterally scored, trimmed, and cut to form the gum sheets.

20. The process of claim 6 wherein the wax-free gum product is a chewing gum.

21. The process of claim 6 wherein the wax-free gum product is a bubble gum.

22. The process of claim 6 wherein the wax-free gum product has a soft initial bite and is manufactured in from about 10% to about 60% of the time required to manufacture a comparable wax containing gum product.

23. The process of claim 6 wherein the raw gum mixture contains at least one gum base comprising:

| Ingredient | Wt. percent of gum base |
| --- | --- |
| synthetic elastomers | 20–60 percent |
| natural elastomers | 0–30 percent |
| elastomer plasticizer | 5–55 percent |
| fillers | 5–40 percent |
| fats, oils, softeners | 5–40 percent, | and further wherein the chewing gum comprises water soluble ingredients and flavoring agents, such that the chewing gum comprises:

| Ingredient | Wt. percent of chewing gum |
| --- | --- |
| gum base | 10–80 percent |
| water soluble ingredients | 10–90 percent |

| Ingredient | Wt. percent of chewing gum |
|---|---|
| flavoring agents | 0.10–10.0 percent |

24. The process of claim 6 wherein the raw gum mixture comprises at least one wax-free gum base, water soluble ingredients and at least one flavoring agent.

25. The process of claim 6 wherein the wax-free chewing gum base comprises:

| Ingredient | Wt. percent of gum base |
|---|---|
| synthetic elastomers | about 20–60 percent |
| natural elastomers | about 0–30 percent |
| elastomer plasticizer | about 5–55 percent |
| fillers | about 5–40 percent |
| fats, oils, softeners | about 5–40 percent, | and further wherein the water soluble bulking agents comprise: water soluble softeners, water soluble binding agents, and

| Ingredient | Wt. percent of bulking agent |
|---|---|
| sweeteners selected from high intensity sweetener, low intensity sweeteners, and admixtures thereof; | about 0.01–98 percent |
| water soluble softeners and emulsifiers | 1.0–50 percent |
| binding agents | 1.0–50 percent |

26. The process of claim 24 wherein the raw gum mixture comprises:

| Ingredient | Wt. percent of gum mixture |
|---|---|
| a) a wax-free gum base comprising synthetic elastomers, optionally natural elastomers, elastomer plasticizers, fillers, fats, oils and softeners; | 15–35 percent |
| b) flavors | 0.1–10.0 percent |
| c) water soluble bulking agents | 50–85 percent, | and further wherein the raw gum mixture comprises from about 0.0 to about 10 weight percent trim gum.

27. The process of claim 6 wherein the raw gum mixture comprises a wax-free gum base comprising:

| Ingredient | Wt. percent of gum base |
|---|---|
| synthetic elastomers | 20–60 percent |
| elastomer plasticizer | 5–55 percent |
| fillers | 5–40 percent |
| fats, oils, softeners | 5–40 percent, | and further wherein the water soluble bulking agents comprise:

| Ingredient | Wt. percent of bulking agent |
|---|---|
| a) sweeteners selected from the group consisting of high intensity sweeteners, low intensity sweeteners, and mixtures thereof; | 0.01–98 percent |
| b) water soluble softeners and emulsifiers | 1.0–50 percent |
| c) binding agents | 1.0–50 percent |

28. The process of claim 6 wherein the chewing gum mixture comprises:

| Ingredient | Wt. percent of gum mixture |
|---|---|
| a wax-free gum base | 15–40 percent |
| flavors | 0.1–10 percent |
| water soluble bulking agents | 50–85 percent, | and further wherein the wax-free gum base comprises:

| Ingredient | Wt. percent of gum base |
|---|---|
| synthetic elastomers | 20–60 percent |
| elastomer plasticizer | 5–55 percent |
| fillers | 5–40 percent |
| fats, oils, softeners | 5–40 percent, | and further, wherein the synthetic elastomers are selected from the group consisting of polyisobutylene, polyisoprene, isobutylene-isoprene copolymer, styrene-butadiene copolymer, polyvinyl acetate or mixtures thereof; and further wherein the water soluble bulking agents comprise:

| Ingredient | Wt. percent of bulking agent |
|---|---|
| a) sweeteners selected from high intensity sweeteners, low intensity sweeteners, and mixtures thereof | 0.01–98 percent |
| b) water soluble softeners and emulsifiers | 1.0–50 percent |
| c) binding agents | 1.0–50 percent | and further wherein the water soluble softeners and emulsifiers are selected from the group consisting of glycerin, propylene glycol, lecithin, and mixtures thereof and the binding agents are selected from the group consisting of sugar syrups, sugar alcohol syrups, hydrogenated starch hydrolyzate syrups, coevaporated Lycasin, and mixtures thereof.

29. The process of claim 1 wherein the raw mixture comprises:

| Ingredient | Wt. percent of gum mixture |
|---|---|
| a) a wax-free gum base comprising synthetic elastomers, optionally natural elastomers, elastomer plasticizers, fillers, fats, oils and softeners; | 15–40 percent |
| b) flavors | 0.1–10.0 percent |
| c) water soluble bulking | 50–85 percent, |

-continued

| Ingredient | Wt. percent of gum mixture |
|---|---|
| agents | | and further wherein the raw mixture comprises from about 0.0 to about 20 weight percent trim gum.

30. The process of claim 1 wherein the raw mixture comprises a wax-free gum base comprising:

| Ingredient | Wt. percent of gum base |
|---|---|
| synthetic elastomers | 20-60 percent |
| elastomer plasticizer | 5-55 percent |
| fillers | 5-40 percent |
| fats, oils, softeners | 5-40 percent, | and further wherein the water soluble bulking agents comprise:

| Ingredient | Wt. percent of bulking agent |
|---|---|
| a) sweeteners selected from the group consisting of high intensity sweeteners, low intensity sweeteners, and mixtures thereof; | 0.01-98 percent |
| b) water soluble softeners and Emulsifiers | 1.0-50 percent |
| c) binding agents | 1.0-50 percent |

31. The process of claim 6 wherein the chewing gum mixture comprises:

| Ingredient | Wt. percent of gum mixture |
|---|---|
| a wax-free gum base | 15-35 percent |
| flavors | 0.1-10 percent |
| water soluble bulking agents | 50-85 percent, | and further wherein the wax-free gum base comprises:

| Ingredient | Wt. percent of gum base |
|---|---|
| synthetic elastomers | 20-60 percent |
| elastomer plasticizer | 5-55 percent |
| fillers | 5-40 percent |
| fats, oils, softeners | 5-40 percent, | and further, wherein the synthetic elastomers are selected from the group consisting of polyisobutylene, polyisoprene, isobutylene-isoprene copolymer, styrene-butadiene copolymer, or mixtures thereof; and further wherein the water soluble bulking agents comprise:

| Ingredient | Wt. percent of bulking agent |
|---|---|
| a) sweeteners selected from high intensity sweetener, low intensity sweeteners, and mixtures thereof; | 0.01-98 percent |
| b) water soluble softeners and emulsifiers | 1.0-50 percent |
| c) binding agents | 1.0-50 percent | and further wherein the water soluble softeners and emulsifiers are selected from the group consisting of glycerin, propylene glycol, triacetin, and mixtures thereof and the binding agents are selected from the group consisting of sugar syrups, sugar alcohols syrups, hydrogenated starch hydrolyzate syrups, coevaporated Lycasin, and mixtures thereof.

32. The process of claim 6 wherein the chewing gum mixture contains at least one gum base comprising:

| Ingredient | Wt. percent of gum base |
|---|---|
| synthetic elastomers | 20-60 percent |
| natural elastomers | 0-30 percent |
| elastomer plasticizer | 5-55 percent |
| fillers | 5-40 percent |
| fats, oils, softeners | 5-40 percent, | and further wherein the chewing gum comprises water soluble ingredients and flavoring agents, such that the chewing gum comprises:

| Ingredient | Wt. percent of chewing gum |
|---|---|
| gum base | 10-80 percent |
| water soluble ingredients | 10-90 percent |
| flavoring agents | 0.10-10.0 percent |

33. The process of claim 32 wherein the water soluble ingredients comprise:

| Ingredient | Wt. percent of water soluble ingredients |
|---|---|
| sweeteners | 1.0-95 percent |
| water soluble softeners | 1.0-15 percent |
| glycerin modified binders | 5.0-60 percent |

34. The process of claim 32 wherein the sweeteners are selected from the group consisting of high intensity sweeteners, low intensity sweeteners, or mixtures thereof.

35. A chewing gum manufactured by the process of claim 6 wherein the chewing gum has an initial soft bite as measured by having a Taber Stiffness between from about 15 to about 55 Taber Units, and which soft bite is at least 5 percent softer than a comparable wax containing gum.

36. The chewing gum of claim 6 wherein the chewing gum comprises at least one gum base, water soluble ingredients and at least one flavoring agent, said gum having an initial soft bite that is at least 5 percent softer than a comparable wax containing chewing gum.

37. The raw mixture of claim 1 comprising at least one gum base having the ingredients:

| Ingredient | Wt. percent of gum base |
|---|---|
| a) at least two synthetic elastomers selected from the group consisting of polyisobutylene, styrenebutadiene copolymer, polyisoprene, isoprene-isobutylene copolymer, polyvinyl acetate and mixtures thereof | 20-60 percent |
| b) elastomer plasticizers selected from the group consisting of natural rosin esters of glycerol, glycerol esters of partially hydrogenated rosin, | 5-55 percent |

| Ingredient | Wt. percent of gum base |
|---|---|
| terpene resins, pentaerythritol esters of rosin, methyl or ethyl esters of partially hydrogenated rosin, or mixtures thereof | |
| c) fillers | 5-40 percent |
| d) fats, oils, softeners | 5-40 percent, | and further wherein the raw-mixture comprises water soluble bulking agents having the ingredients:

| Ingredient | Wt. percent of water soluble ingredients |
|---|---|
| sweeteners | 1.0-99 percent |
| water soluble softeners | 1.0-15.0 percent |
| glycerin modified binders | 5.0-60.0 percent | wherein the sweeteners may be high intensity sweeteners, low intensity sweeteners, or mixtures thereof; and the water soluble softeners are selected from glycerins, propylene glycol, or mixtures thereof.

38. The chewing gum of claim 37 wherein the glycerin modified binder is a glycerin modified hydrogenated starch hydrolyzate comprising from about 20-30 weight percent glycerin, from about 7-10 weight percent $H_2O$, and hydrogenated starch hydrolyzate solids, and further wherein the chewing gum is a low moisture chewing gum having less than 2.0 weight percent $H_2O$, based on total chewing gum weight.

* * * * *

UNITED STATES PATENT AND TRADEMARK OFFICE
CERTIFICATE OF CORRECTION

PATENT NO.  : 5,436,013
DATED       : July 25, 1995
INVENTOR(S) : Steven P. Synosky et al.

It is certified that error appears in the above-indentified patent and that said Letters Patent is hereby corrected as shown below:

On the Title page, item [75]:

delete "Merrillvile" and substitute --Merrillville--.

<u>In the Claims</u>
Col. 30;
    In claim 14, line 16, after "35" delete "°C.".

In claim 17, line 29, after "chewing" insert --gum--.
Col. 34;
    In claim 31, line 40 (column 34, line 3), delete "alcohols" and substitute --alcohol--.

Signed and Sealed this

First Day of October, 1996

Attest:

BRUCE LEHMAN

Attesting Officer        Commissioner of Patents and Trademarks